US011252857B2

(12) United States Patent
Ritland et al.

(10) Patent No.: US 11,252,857 B2
(45) Date of Patent: Feb. 22, 2022

(54) SEED FURROW LIQUID APPLICATION SYSTEMS, METHODS, AND APPARATUSES

(71) Applicant: 360 YIELD CENTER, LLC, Morton, IL (US)

(72) Inventors: Tyler Ritland, Tremont, IL (US); Connor Hesterberg, Tremont, IL (US); Timothy Sauder, Morton, IL (US); Brandon Tate, Tremont, IL (US); Jonathan T. Welte, Tremont, IL (US); Justin Koch, Tremont, IL (US); Phillip Baurer, Tremont, IL (US)

(73) Assignee: 360 YIELD CENTER, LLC, Morton, IL (US)

( * ) Notice: Subject to any disclaimer, the term of this patent is extended or adjusted under 35 U.S.C. 154(b) by 145 days.

(21) Appl. No.: 16/519,203

(22) Filed: Jul. 23, 2019

(65) Prior Publication Data

US 2020/0022301 A1 Jan. 23, 2020

Related U.S. Application Data

(60) Provisional application No. 62/796,893, filed on Jan. 25, 2019, provisional application No. 62/702,281, filed on Jul. 23, 2018.

(51) Int. Cl.
| | | |
|---|---|---|
| *A01C 7/06* | (2006.01) | |
| *A01C 23/00* | (2006.01) | |
| *A01C 21/00* | (2006.01) | |
| *A01C 7/10* | (2006.01) | |
| *A01C 7/08* | (2006.01) | |
| *A01C 7/20* | (2006.01) | |
| *A01C 23/04* | (2006.01) | |

(52) U.S. Cl.
CPC ............... *A01C 7/06* (2013.01); *A01C 7/105* (2013.01); *A01C 7/206* (2013.01); *A01C 21/007* (2013.01); *A01C 23/007* (2013.01); *A01C 7/08* (2013.01); *A01C 23/047* (2013.01)

(58) Field of Classification Search
CPC .......... A01C 7/06; A01C 7/105; A01C 7/206; A01C 21/007; A01C 23/007; A01C 23/047
See application file for complete search history.

(56) References Cited

U.S. PATENT DOCUMENTS

| | | | | |
|---|---|---|---|---|
| 5,343,761 | A * | 9/1994 | Myers | .................... A01C 7/105 73/861 |
| 7,370,589 | B2 * | 5/2008 | Wilkerson | ............... A01C 7/06 111/127 |
| 2019/0159398 | A1 * | 5/2019 | McMenamy | ........ A01C 23/028 |
| 2019/0350127 | A1 * | 11/2019 | Sauder | ................. A01C 23/007 |
| 2019/0364720 | A1 * | 12/2019 | Garner | ................... A01C 7/105 |
| 2021/0068338 | A1 * | 3/2021 | Stoller | ................... A01C 5/068 |
| 2021/0084807 | A1 * | 3/2021 | Obrist | ...................... A01C 1/06 |

* cited by examiner

*Primary Examiner* — Thomas B Will
*Assistant Examiner* — Ian A Normile
(74) *Attorney, Agent, or Firm* — Klintworth & Rozenblat IP LLP

(57) ABSTRACT

In one aspect, a crop input applicator is provided. In one aspect, the applicator comprises a valve (e.g., voice coil valve) disposed to deposit liquid on or near a seed furrow and/or on or near a seed. In one aspect, the applicator includes one or more seed sensors disposed to detect passage of seeds.

21 Claims, 32 Drawing Sheets

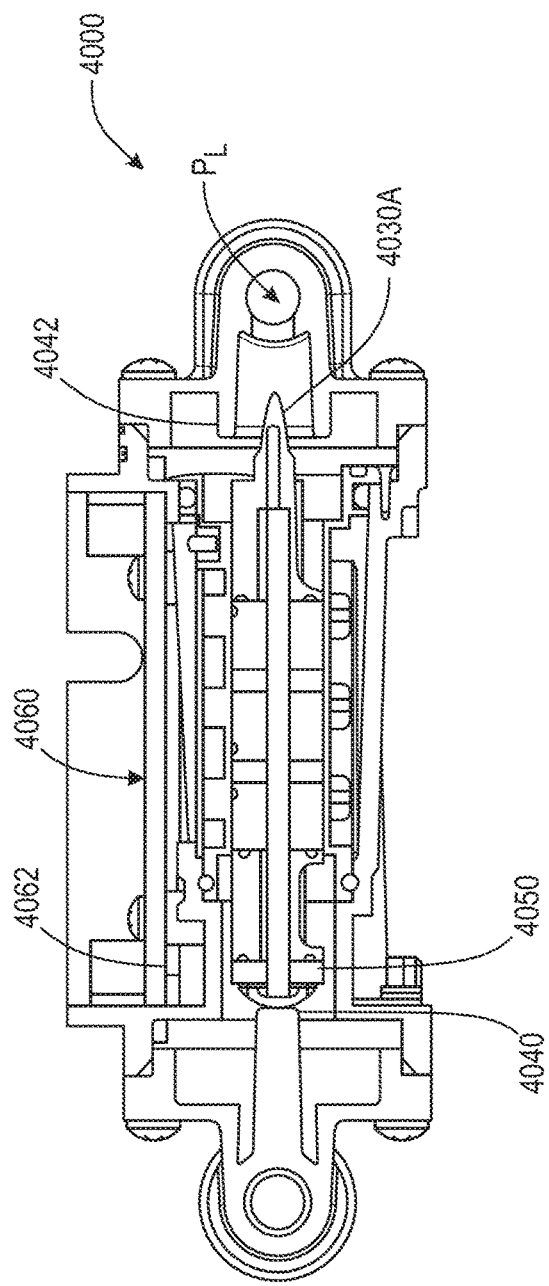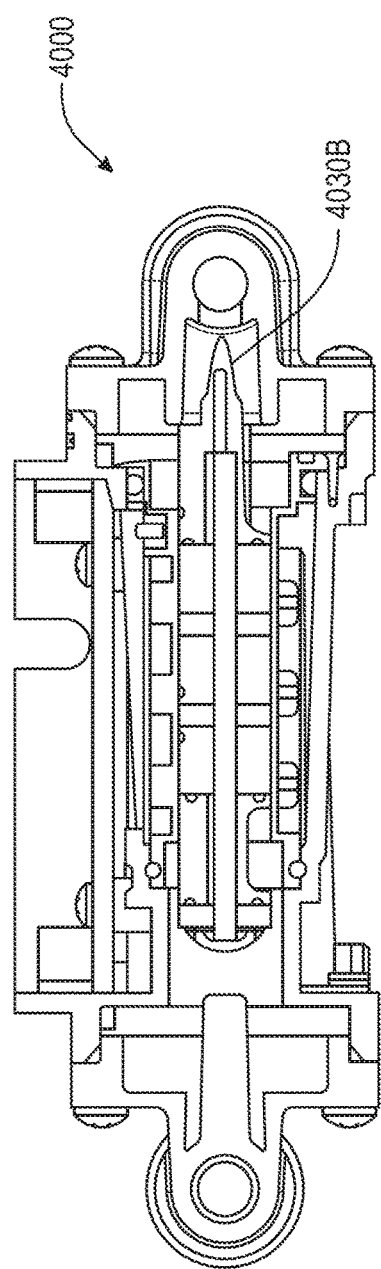
FIG. 35A
FIG. 35B

SEED FURROW LIQUID APPLICATION SYSTEMS, METHODS, AND APPARATUSES

CROSS-REFERENCE TO RELATED APPLICATIONS

This application claims the benefit of priority to U.S. provisional application No. 62/796,893, entitled SEED FURROW LIQUID APPLICATION SYSTEMS, METHODS, AND APPARATUSES, filed on Jan. 25, 2019, and also claims the benefit of priority to U.S. provisional application No. 62/702,281, entitled SEED FURROW LIQUID APPLICATION SYSTEMS, METHODS AND APPARATUSES, filed on Jul. 23, 2018, both of which are hereby incorporated by reference in their entireties.

BACKGROUND

Crop input applicators are used to apply crop inputs (e.g., liquid, fertilizer, nitrogen, etc.) into soil. Some such applicators are incorporated on a planter row unit.

SUMMARY

In one embodiment, a crop input monitoring system is disclosed. The crop input monitoring system includes a seed sensor, a crop input outlet, and a valve. The seed sensor is configured to send a seed. The crop input outlet is configured to deposit crop input. The valve is connected to the crop input outlet. The valve is configured to selectively control the crop input being deposited through the crop input outlet.

In another embodiment, a method of monitoring a crop input is disclosed. One step comprises sensing a seed with a seed sensor. Another step comprises depositing a crop input through a crop input outlet. Still another step comprises selectively controlling the depositing of the crop input using a valve.

The scope of the present disclosure is defined solely by the appended claims and is not affected by the statements within this summary.

BRIEF DESCRIPTION OF THE DRAWINGS

FIG. 35A is a sectional view of the viscometer of FIG. 34 in an open configuration.

FIG. 35B is a sectional view of the viscometer of FIG. 34 in an open configuration.

DESCRIPTION

Figure 1:
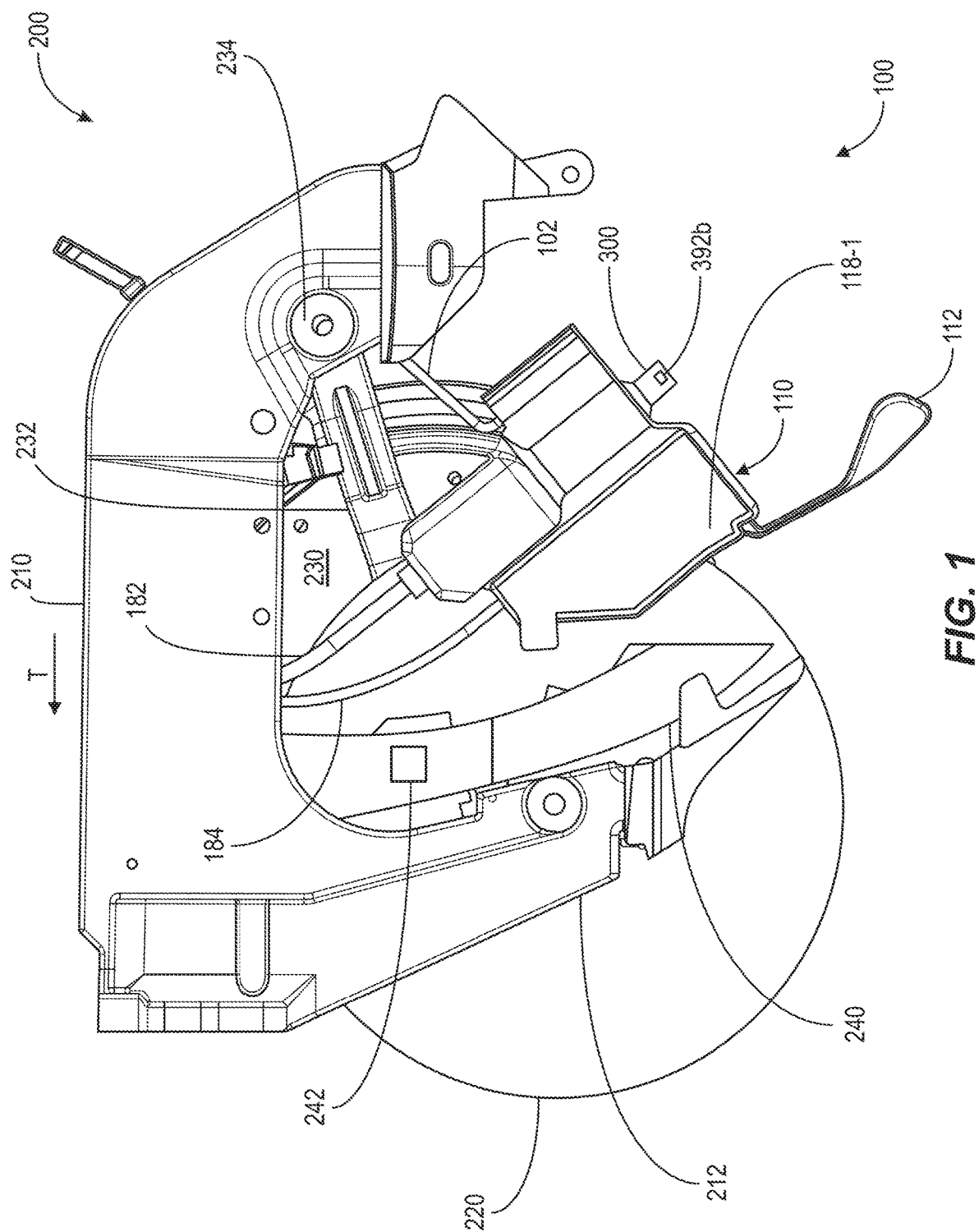
FIG. 1 is a partial side elevation view of an embodiment of a liquid applicator assembly mounted to an embodiment of a planter row unit.

Referring to the drawings, wherein like reference numerals designate identical or corresponding parts throughout the several views, FIGS. 1-5 illustrate an embodiment of an applicator assembly 100 mounted to an embodiment of a row unit 200.

The row unit 200 may be any row unit configured to deposit seeds in the ground (e.g., by first forming seed furrow). In the illustrated embodiment, the row unit 200 includes a subframe 210 which may be mounted to a transversely-extending planter toolbar (not shown) such as by a set of parallel arms (not shown). The toolbar draws the planter along the travel direction T generally indicated in FIG. 1.

Figure 2:
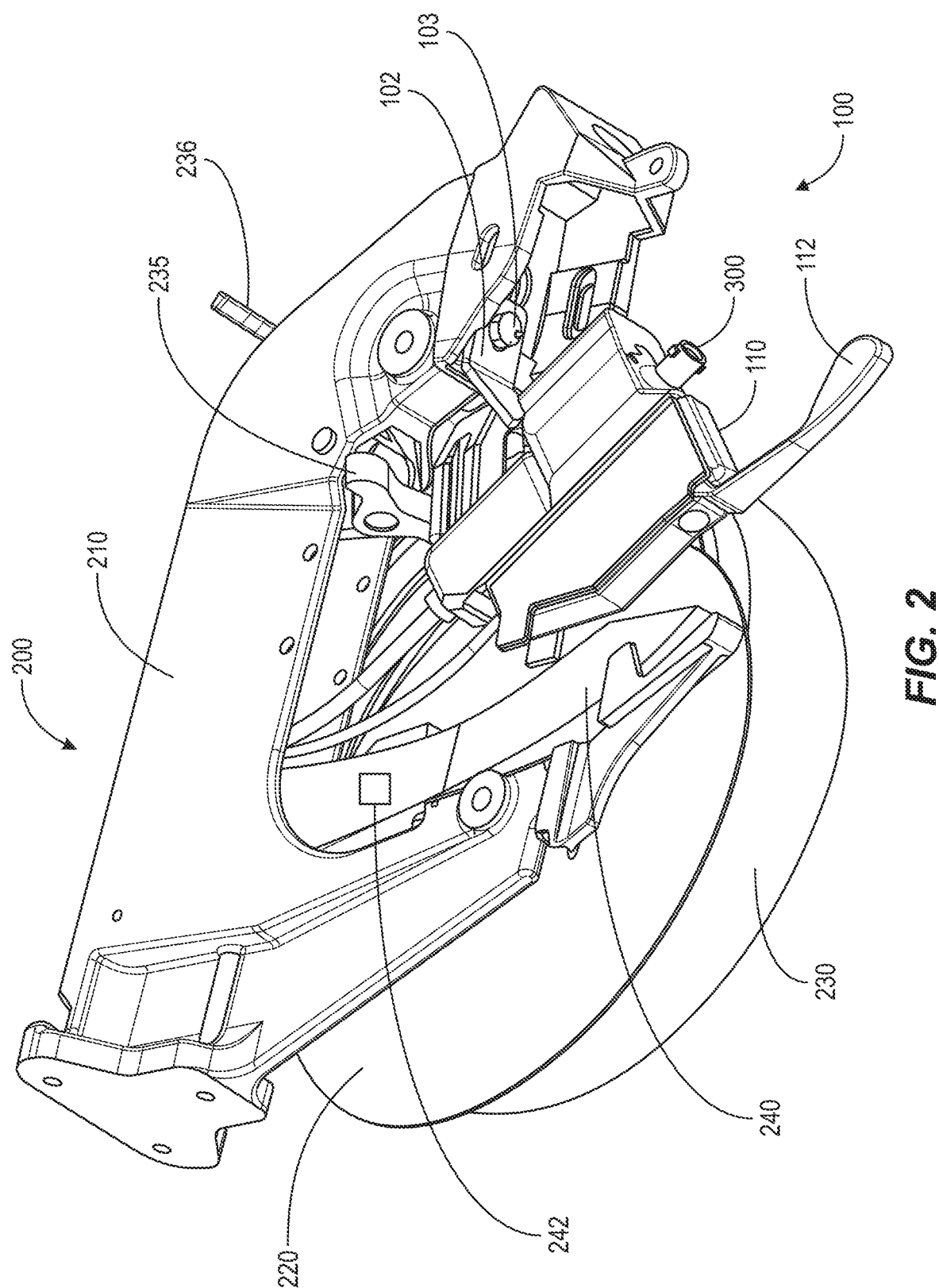
FIG. 2 is a partial perspective view of the liquid applicator assembly of FIG. 1.
Figure 3:
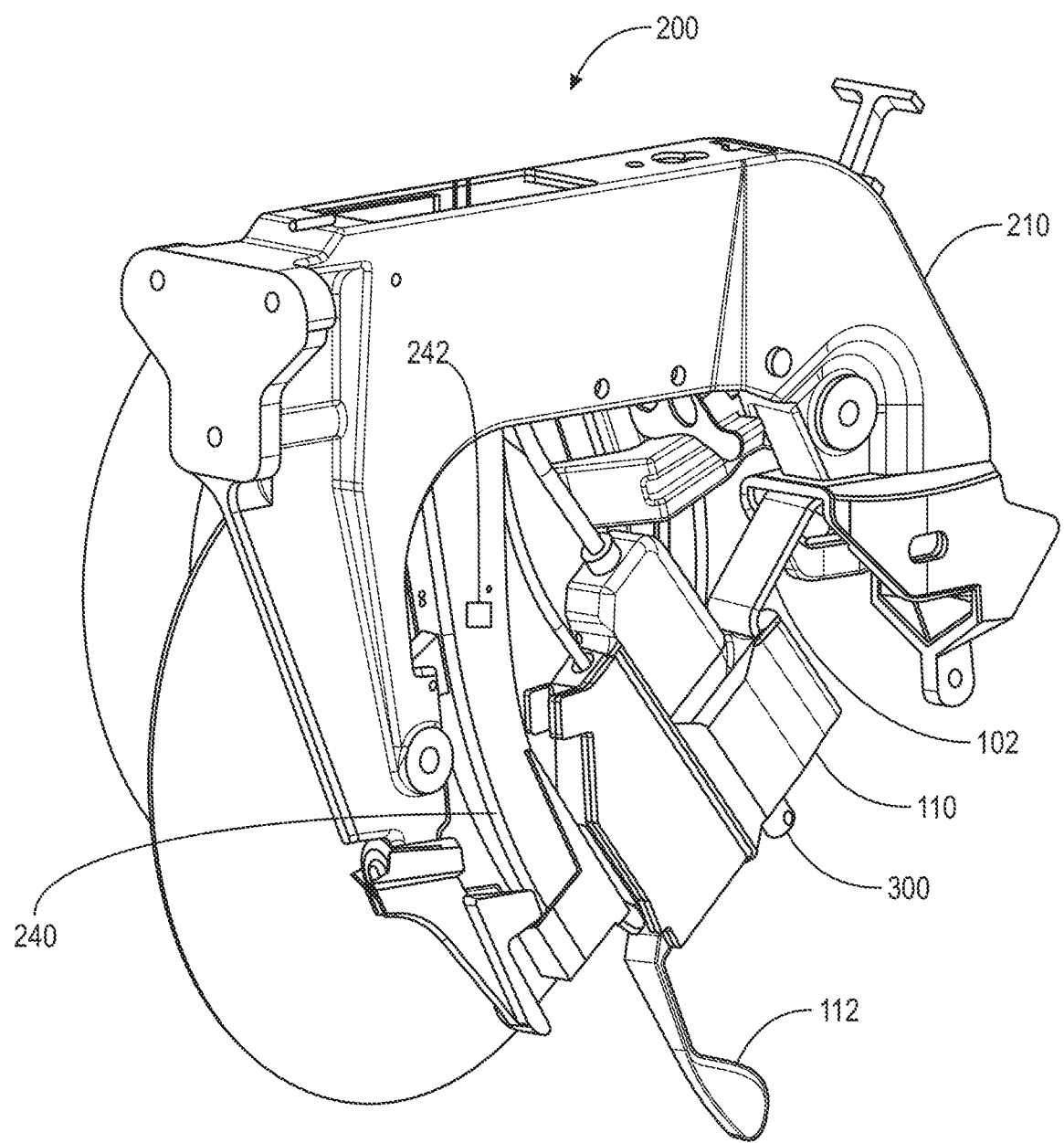
FIG. 3 is another partial perspective view of the liquid applicator assembly of FIG. 1.
Figure 4:
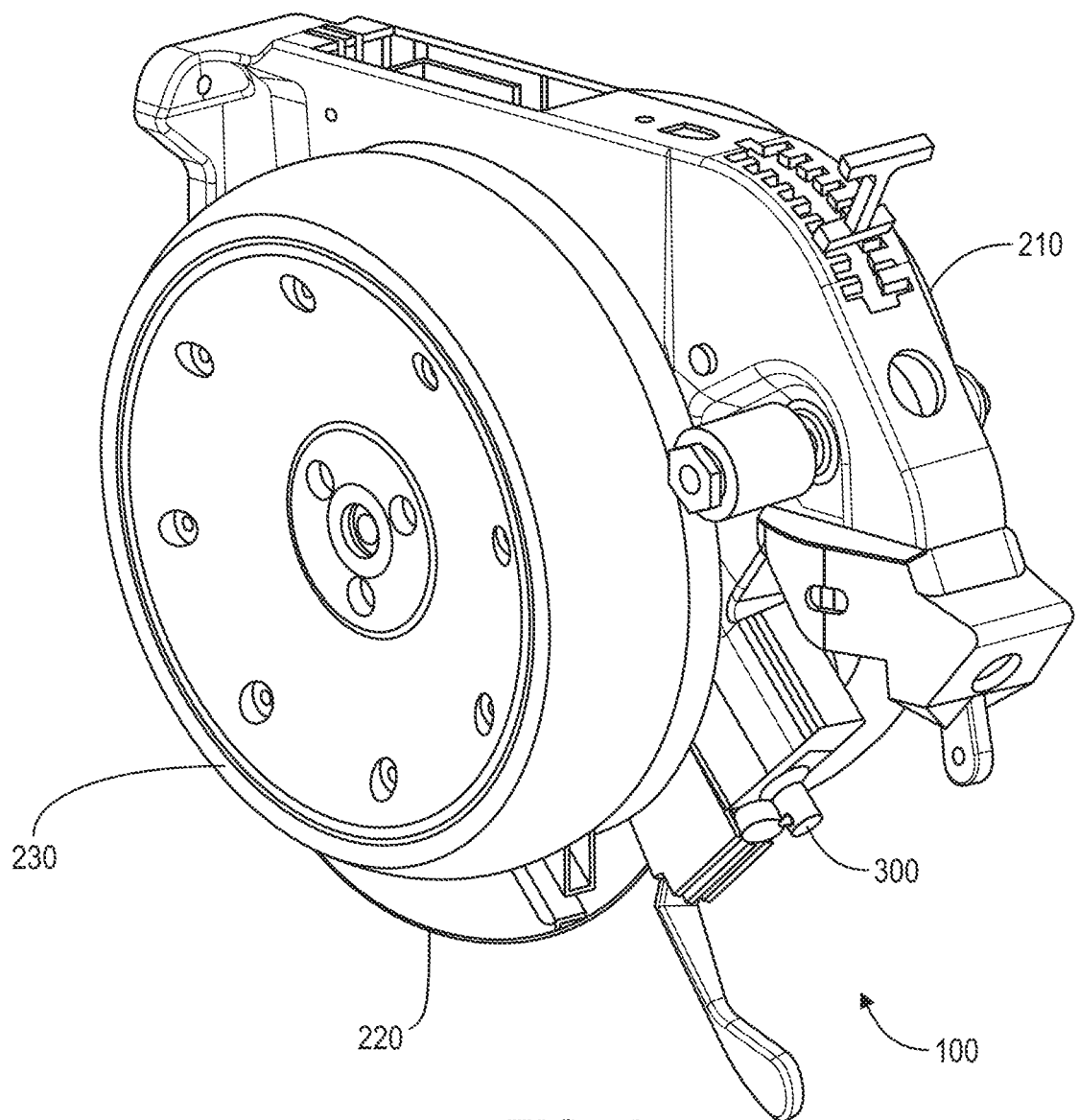
FIG. 4 is another partial perspective view of the liquid applicator assembly of FIG. 1.
Figure 5:
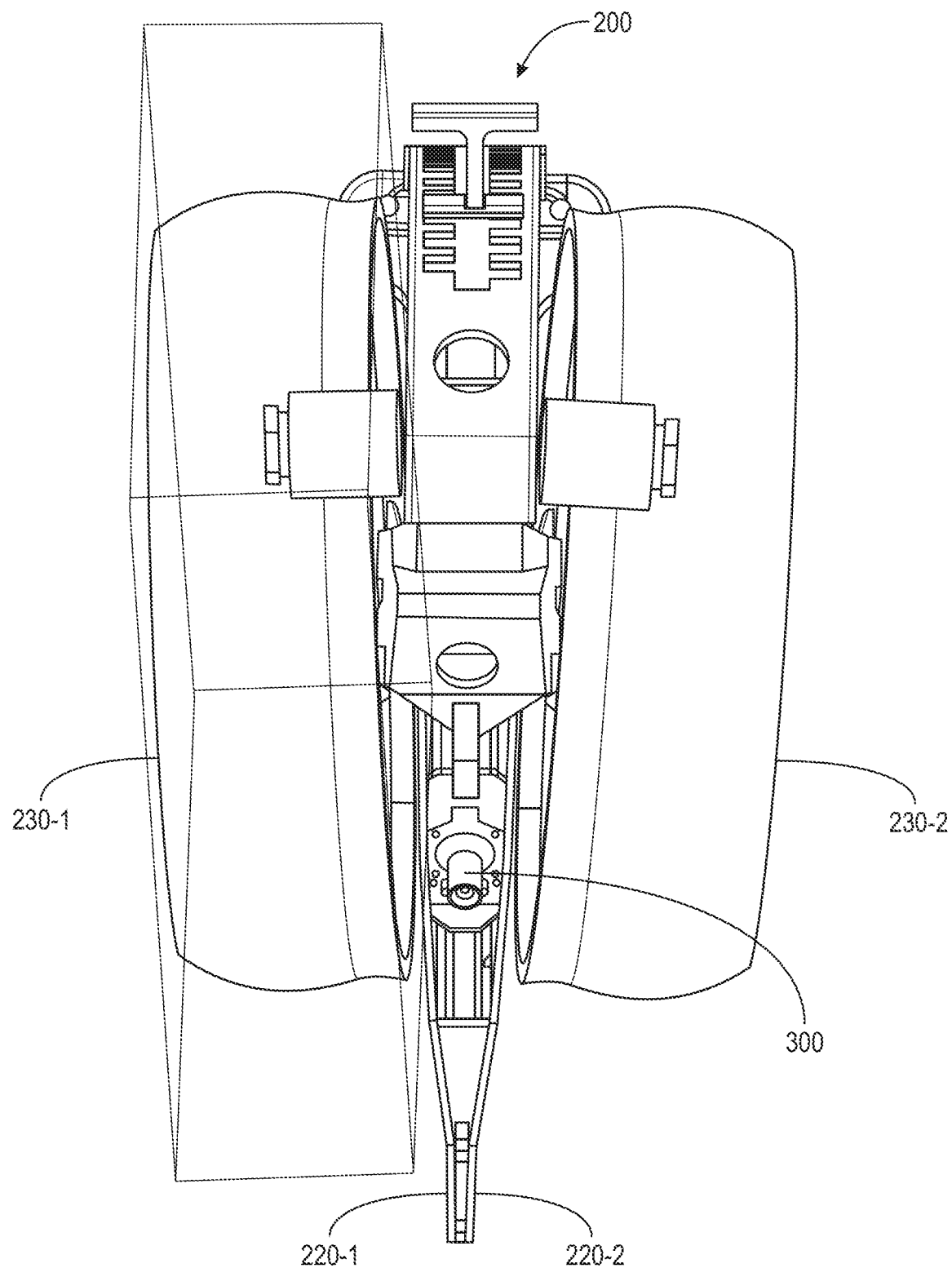
FIG. 5 is a rear elevation view of the liquid applicator assembly of FIG. 1.

The subframe 210 optionally includes a downwardly extending shank 212 rollingly supporting one or more opener discs 220 (e.g., 220-1 and 220-2). The opener discs 220 are optionally disposed to open a furrow (e.g., generally V-shaped furrow) in a soil surface as the row unit 200 moves along the travel direction T. In order to set the depth of the furrow, in some embodiments, one or more gauge wheels 230 are supported on the row unit and disposed to roll along the surface of the soil. Each gauge wheel 230 is optionally rollingly mounted to an associated gauge wheel arm 232 which is in turn pivotally mounted (e.g., at a pivot 234) to the subframe 210. Referring to FIG. 2, in some embodiments the maximum height of each gauge wheel arm 232 (and thus the depth of the furrow) is set by a stop 235 (e.g., rocker) which is optionally height-adjustable using a depth setting interface 236 such as a lever.

Figure 7:
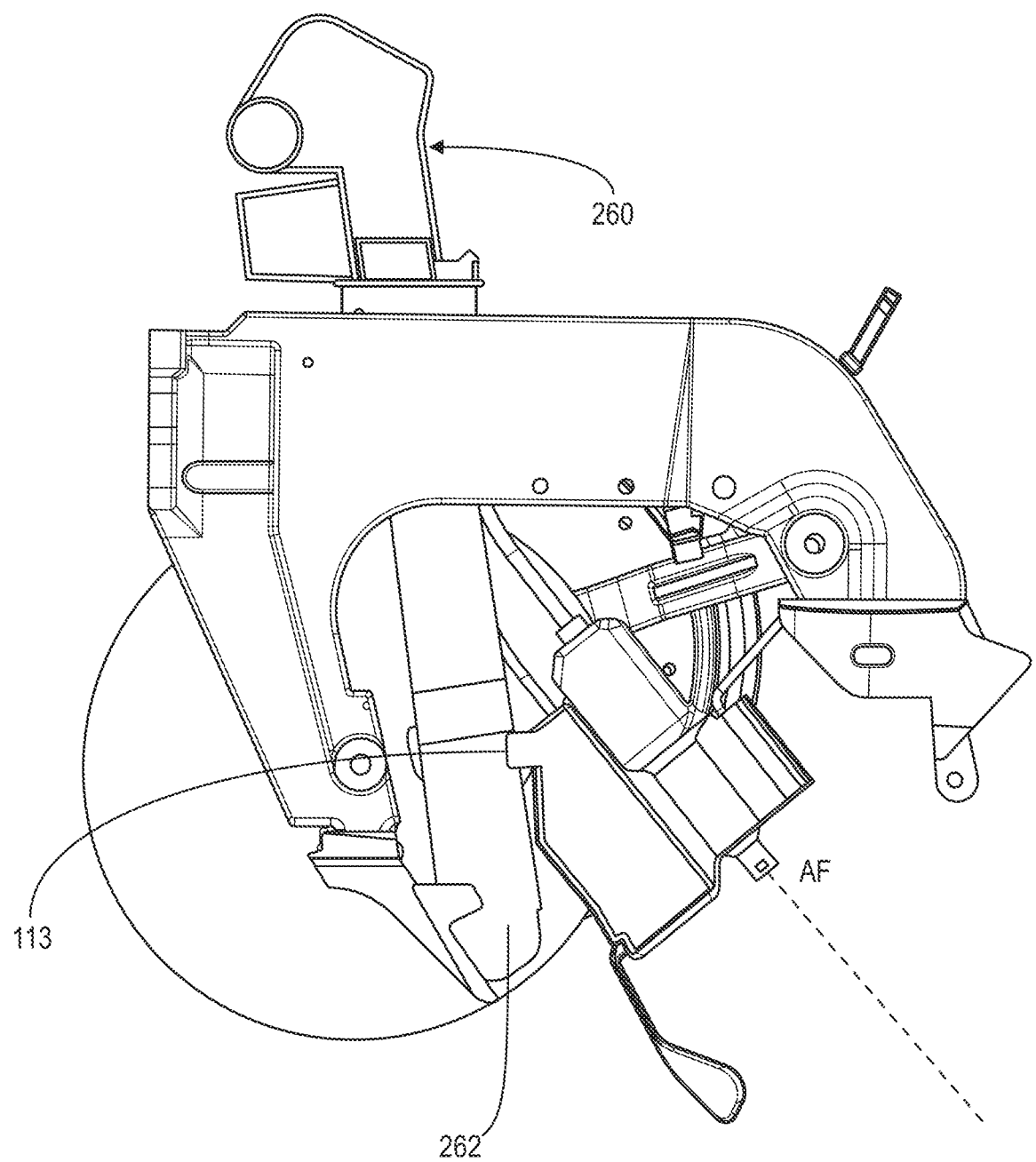
FIG. 7 is a partial side elevation view of the liquid applicator assembly of FIG. 1 mounted to one example of a planter row unit having one example of a seed conveyor.

A seed tube 240 or other seed conduit or seed conveyor is optionally supported on the subframe 210 to deliver seeds from a meter (not shown) such as a pneumatic seed meter to the seed furrow. In some embodiments, a seed conveyor 262 such as a seed belt (see FIG. 7) or seed brush is incorporated in the row unit instead of a seed tube 240.

Figure 6:
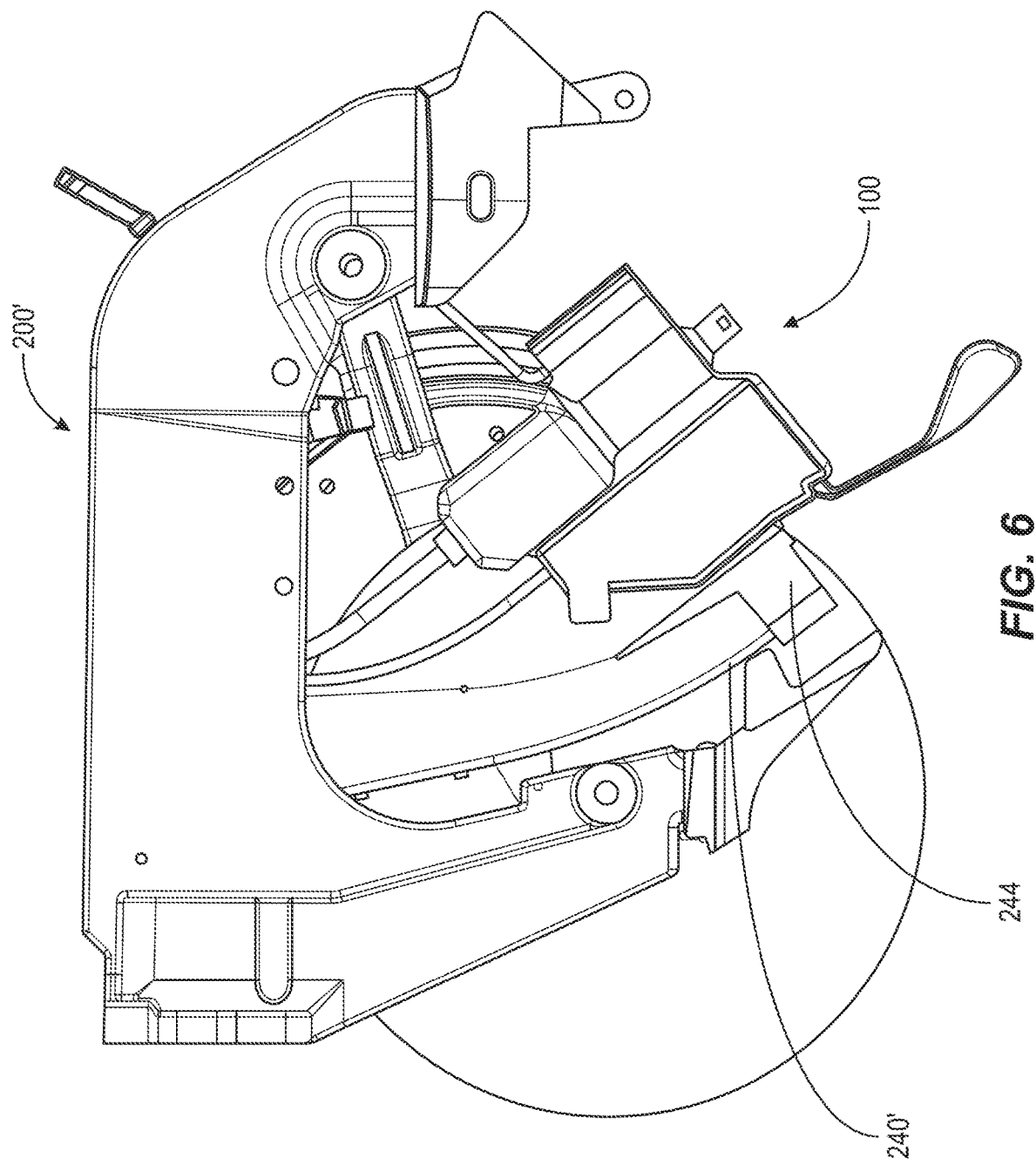
FIG. 6 is a partial side elevation view of the liquid applicator assembly of FIG. 1 mounted to one example of a planter row unit having one example of an electromagnetic seed sensor.

A seed sensor 242 is optionally provided on the seed tube 240 for detection of one or more seeds passing through the seed tube. In some alternative embodiments such as that illustrated in FIG. 6, a planter row unit 200' may include a modified seed tube which additionally or alternatively has a seed sensor 244 (e.g., electromagnetic seed sensor) mounted to the end of the seed tube.

The applicator assembly 100 is optionally supported on a bracket 102 which may be mounted (e.g., by bolt 103) to a rearward portion of the subframe 210. In some embodiments, the applicator assembly 100 is supported alternatively or additionally by forwardly-extending brackets securing the applicator assembly 100 to the shank 212 or seed tube 240.

Figure 8:
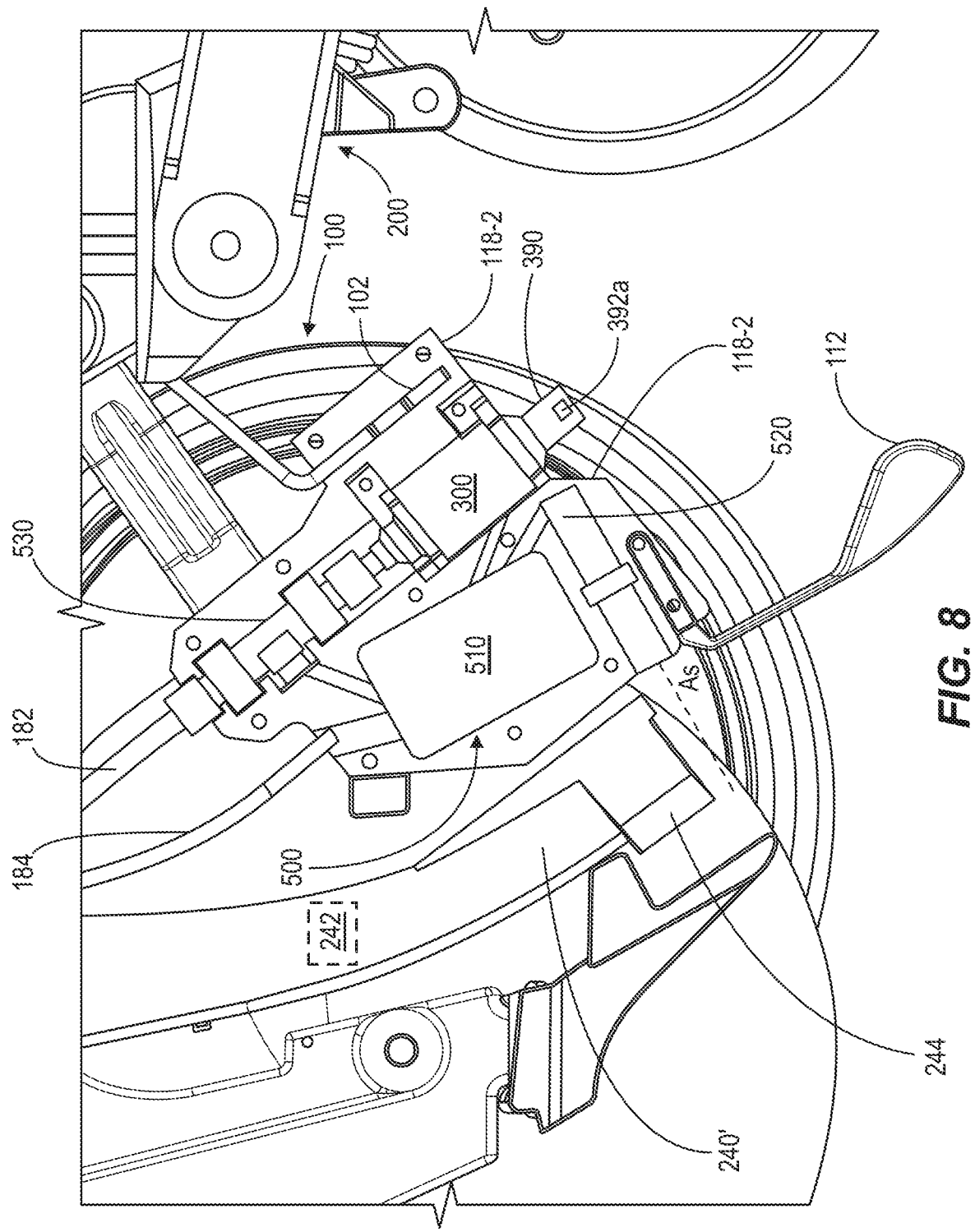
FIG. 8 is an enlarged partial side elevation view of the liquid applicator assembly of FIG. 1 with a housing portion thereof not shown in order to illustrate certain components.
Figure 9:
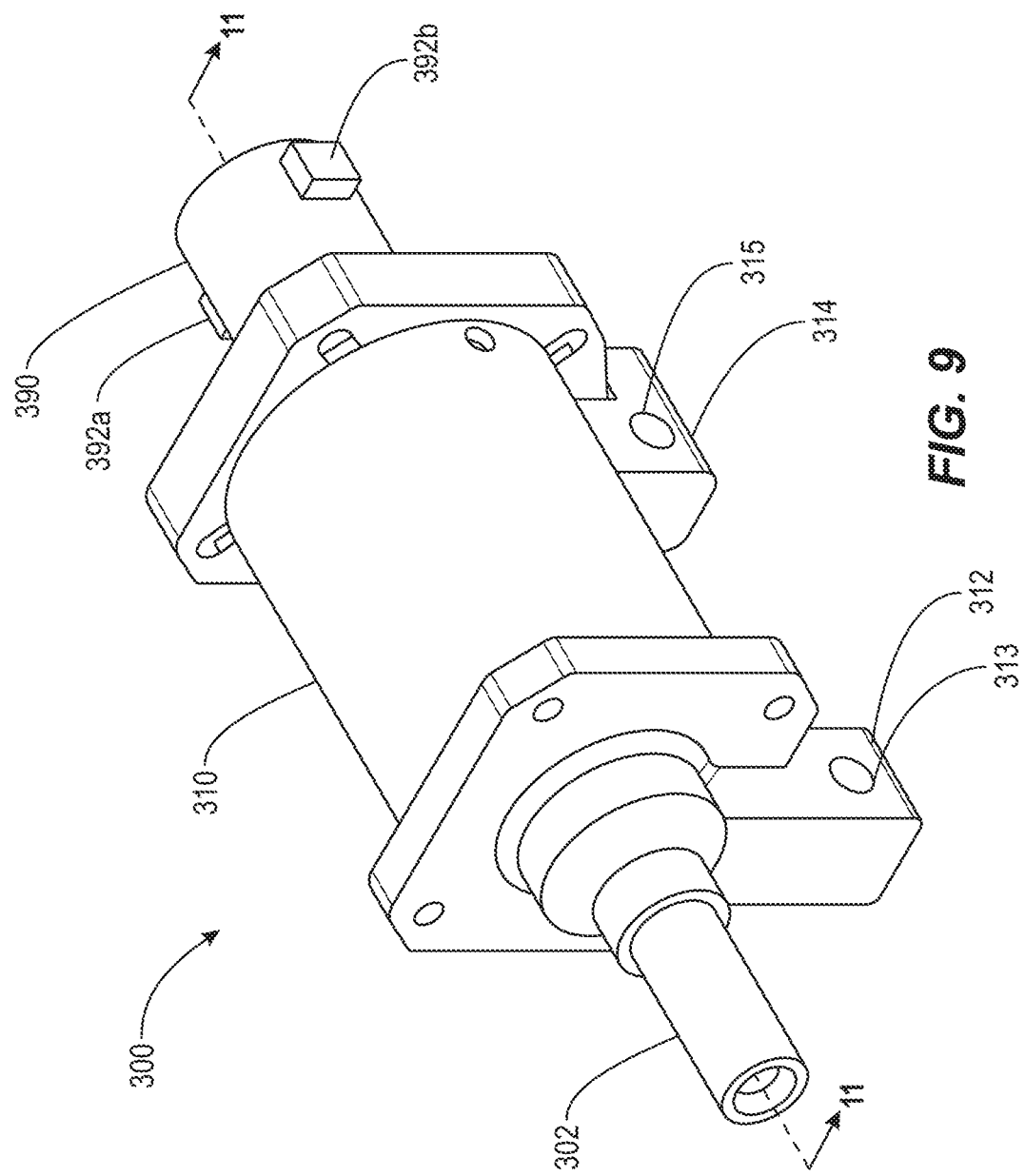
FIG. 9 is a perspective view of an embodiment of a valve.
Figure 10:
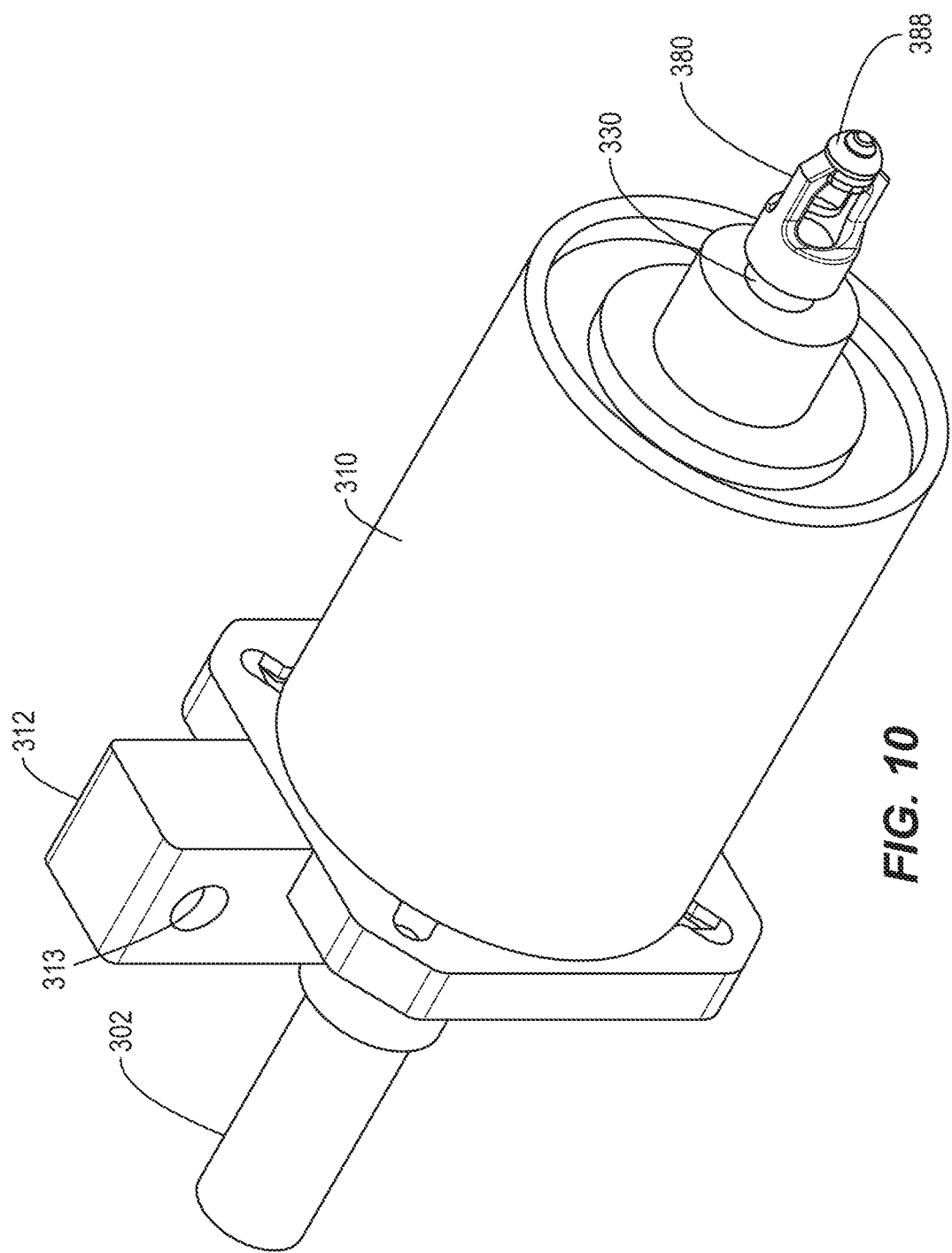
FIG. 10 is another perspective view of the valve of FIG. 9 with an end cap thereof not shown in order to illustrate certain components.

Referring to FIGS. 1 and 8, in some embodiments the applicator assembly 100 comprises a housing 110. In some embodiments, the housing 110 comprises two or more housing portions 118 such as a first portion 118-1 and second portion 118-2. The housing portions are optionally removably attached to one another.

In FIG. 8, first housing portion 118-1 is not shown in order to reveal certain optional components of the applicator assembly 100. The applicator assembly 100 optionally includes a valve 300 such as an on-off valve or flow control valve. The valve 300 is optionally mounted directly or indirectly to the housing 110. The valve 300 is optionally in fluid communication with a fluid source (e.g., container and/or pump which may be supported on the planter or the tractor) via a conduit 182.

In some embodiments, the valve 300 is oriented such that an outlet 390 thereof is disposed to deposit fluid generally along a direction Af (see FIG. 7) toward the seed furrow (e.g., the bottom of the seed furrow). In other embodiments, one or more liquid distributors such as spray nozzles or tubes may be mounted to the outlet 390 for directing fluid flow to locations in or adjacent to the seed furrow, such as by attaching such a distributor to the outlet 390 using one or more attachment tabs 392 (e.g., 392a, 392b).

In some embodiments, a seed firmer 112 is mounted to the housing 110. The seed firmer 112 is optionally configured to resiliently contact the seed furrow (e.g., the bottom of the seed furrow) in order to press seeds against and/or into the soil. The firmer 112 optionally includes one or more attachment points (not shown) for attaching one or more liquid distribution tubes (not shown) therethrough. The liquid distribution tubes may be used to distribute liquid into the furrow and may be in fluid communication with the valve 300.

With continued reference to FIG. 8, a flow meter 530 is optionally also in fluid communication with the conduit 182 for measuring a flow rate of fluid passing through conduit 182 and/or valve 300. The flow meter 530 is optionally mounted directly or indirectly to the housing 110.

The applicator 100 optionally includes a fluid control system 500 comprising a controller 510 (e.g., circuit board, processor, memory, and/or etc.). The controller 510 is optionally mounted to housing 110 or may be mounted elsewhere. The controller 510 is optionally in communication (e.g., electrical communication, data communication, etc.) with one or more monitors or controllers which may be mounted on the row unit, on the toolbar, in the tractor cab, or elsewhere. In some embodiments, communication between controller 510 and other components is enabled by a harness 184 which may include multiple connectors (e.g., power connector, CAN connector, electrical connector, etc.). In some embodiments, the controller 510 is in communication (e.g., data communication, electrical communication, etc.) with the flow meter 530 (e.g., for receiving flow measurement signals therefrom). In some embodiments, the controller 510 is in communication (e.g., data communication, electrical communication, etc.) with the valve 300 (e.g., for sending command signals thereto such as commands to open or close the valve). In some embodiments, a seed sensor 520 is supported on the housing 110 and disposed to detect passage of seeds from the seed tube (e.g., seeds crossing an axis As along which a light or other wave is sent by the seed sensor 520). The seed sensor 520 is optionally in communication (e.g., electrical communication, data communication, etc.) with the controller 510.

Figure 15:
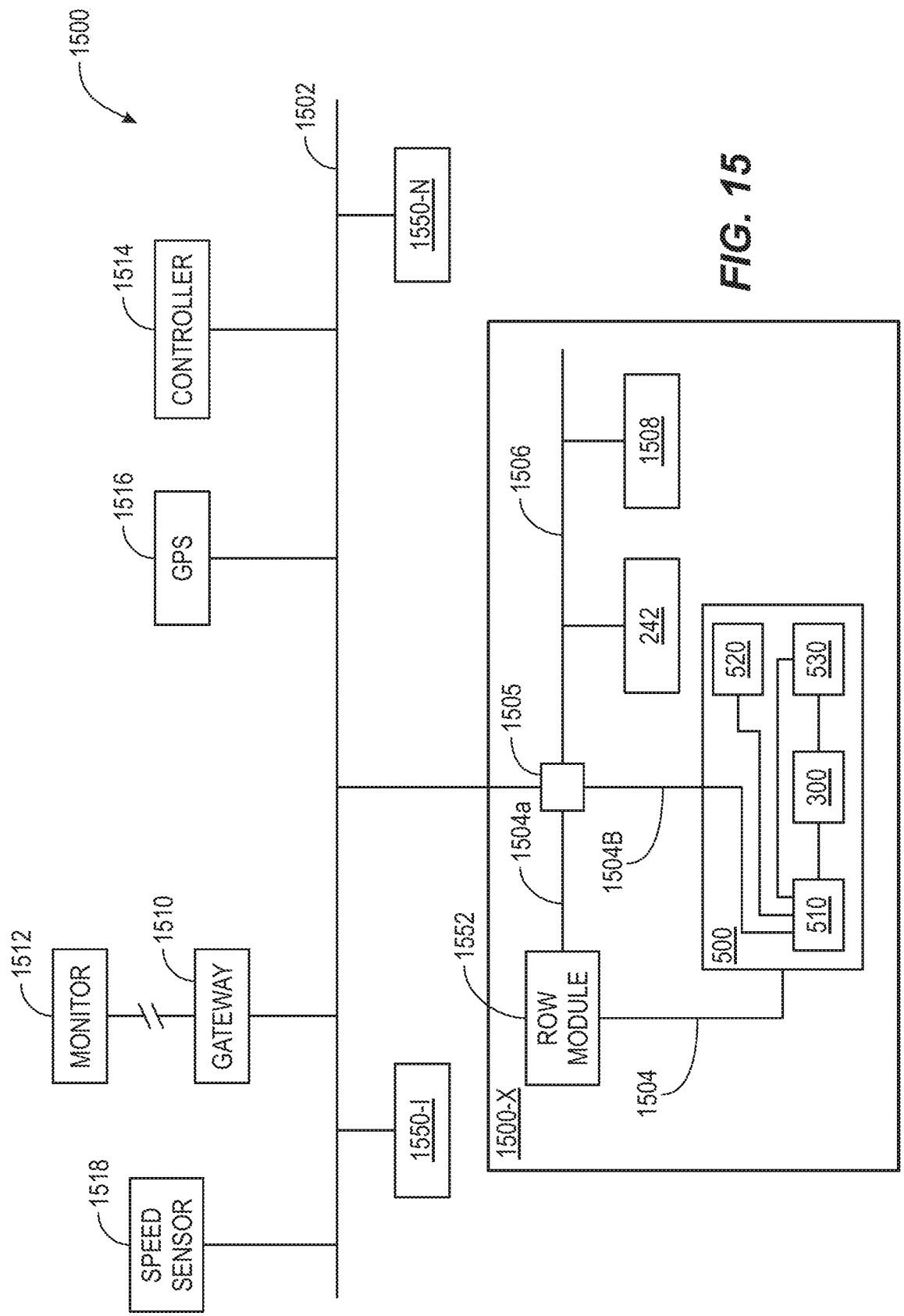
FIG. 15 schematically illustrates an embodiment of a control system.

One example of an embodiment of a planter control system 1500 including control system 500 is schematically illustrated in FIG. 15. A controller 1514 (e.g., having a processor, memory, and/or graphical user interface) is optionally in data communication with an implement data bus 1502 (e.g., CAN bus). A gateway 1510 is also optionally in communication with the bus 1502; the gateway 1510 optionally communicates (e.g., wirelessly) with a monitor 1512 which may comprise monitoring software operating on a consumer computing device (e.g., tablet, smartphone, etc.). The monitor 1512 and controller 1514 are optionally disposed in a cab of a tractor.

A GPS receiver 1516 and speed sensor 1518 (e.g., radar speed sensor, etc.) are also optionally in data communication with the monitor and/or controller (e.g., via the bus 1502).

A plurality of row control systems 1550-1 through 1550-N are optionally in data communication with the bus 1502. Each row control system 1550 is optionally associated with a single planter row unit and optionally includes one or more (e.g., all) components supported on the associated row unit.

Each row control system 1550 optionally includes a row data bus 1506 for data connection to various row unit components such as seed sensor 242, seed meter drive 1508, and other components not shown (e.g., row unit downforce actuator, seed conveyor motor, etc.)

The row data bus 1506 is optionally in communication with a row module 1552 which optionally receives data and/or sends commands to the various row unit components on the row data bus. The row data bus 1506 also optionally receives commands and/or data (e.g., speed, GPS location, commanded planting population, commanded fertilizer rate, etc.) from the implement data bus 1502. The control system 500 is optionally in data communication with the row module 1552 via one or more harnesses 1504 and/or one or more connectors 1505. One or more of the harnesses 1504 or connectors 1505 may also connect the row module 1552 to the row data bus 1506.

In some embodiments, the control system 500 includes the controller 510, which is optionally in data communication with the row module 1552, row data bus 1506, and/or implement data bus 1502. The controller 510 is optionally in data communication with the valve 300. The controller 510 is optionally in data communication with the seed sensor 520. In some embodiments, the seed sensor 520 is supported separately from the seed tube (e.g., on the housing 110). In some embodiments, the seed sensor 520 optionally comprises an acoustic sensor but may also comprise an optical sensor or electromagnetic sensor in other embodiments. The controller 510 is optionally in fluid communication with flow meter 530. Various components of the control system 500 optionally receive power from the row module 1552 via harnesses 1504 and/or via one or more separate electrical connections 1509.

In operation, in some embodiments, the controller 510 receives a liquid application rate command from the controller 1514 and/or monitor 1512 (e.g., via the row data bus 1502 and/or the row module 1552). The controller 510 optionally determines an appropriate valve command to command to the valve 300 in order to establish the commanded liquid application rate. The controller 510 optionally receives a flow rate measurement signal from the flow meter 530 and optionally adjusts the valve command to bring the flow rate measurement signal closer to the signal corresponding to the commanded liquid application rate. The controller 510 optionally reports the flow rate measurement signal to the controller 1514 and/or monitor 1512 (e.g., via the implement data bus 1502 and/or the row module 1552).

In operation, in some embodiments, the controller 510 receives seed position information from seed sensor 242 and/or seed sensor 520 and determines a valve command in order to obtain a predetermined liquid placement relative to one or more seeds (e.g., placement on the seed, placement near the seed, etc.).

In some embodiments, the controller 510 combines the seed position information from seed sensor 242 and seed sensor 520 in order to predict seed position. In one such embodiment, the controller 510 receives seed pulses from seed sensor 242 and determines one or more expected time windows in which a seed should pass seed sensor 520 or the seed sensor 520 should observe a seed. The controller 510 optionally ignores seed pulses from sensor 520 outside of the determined time windows and uses the remaining "non-ignored" seed pulses to determine a position of the seed. The controller 510 optionally commands the valve 300 to open for selected period of time after a given time passes or a given distance is traveled by the row unit following a non-ignored seed pulse. In some embodiments, the sensor 520 and valve 300 are positioned and oriented such that opening the valve 300 immediately upon receiving a seed pulse from sensor 520 results in a desired placement of liquid relative to the seed (e.g., on the seed).

In some embodiments, the controller 510 selects the amount of time that the valve 300 is opened after receiving a seed pulse in order to bring the overall liquid application rate closer to the commanded liquid application rate.

In some embodiments, the controller 510 uses the times of subsequent seed pulses received from sensors 242 and 520 in order to determine a seed velocity and predict a position of the seed relative to valve 300.

It should be appreciated that the control methods described herein with respect to sensor 242 could also be implemented with an electromagnetic sensor 244 or a seed sensor disposed to detect passage of a seed on a seed conveyor 262.

Valve Embodiments

As described above, the valve 300 may be of any configuration for selectively stopping fluid flow and/or modifying a flow rate or pressure of fluid flowing therethrough. However, referring to FIGS. 9-14, an embodiment of a valve 300 is illustrated in more detail.

Figure 11:
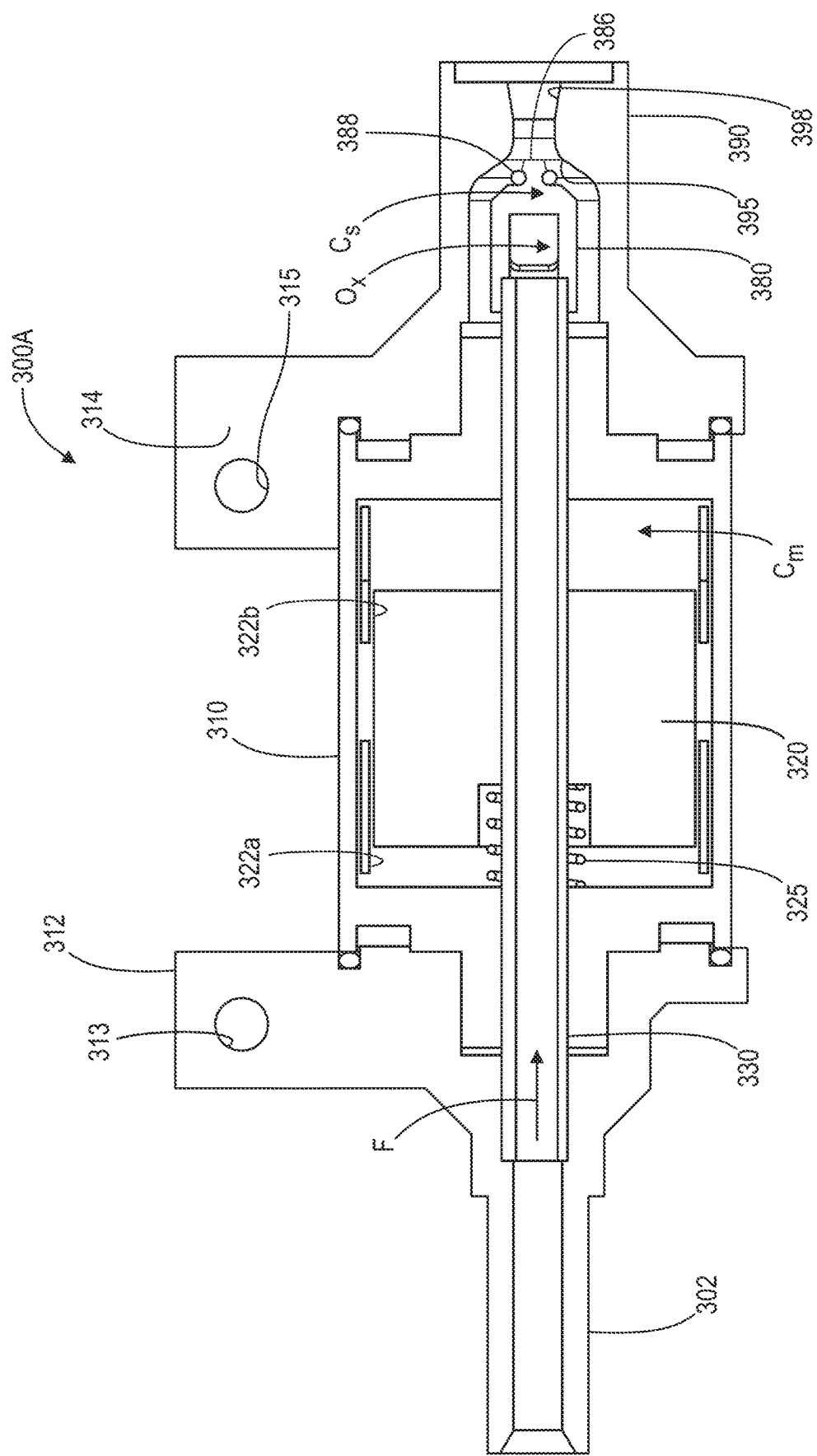
FIG. 11 is a cross-sectional view of the valve of FIG. 9 in an open position or open configuration.
Figure 12:
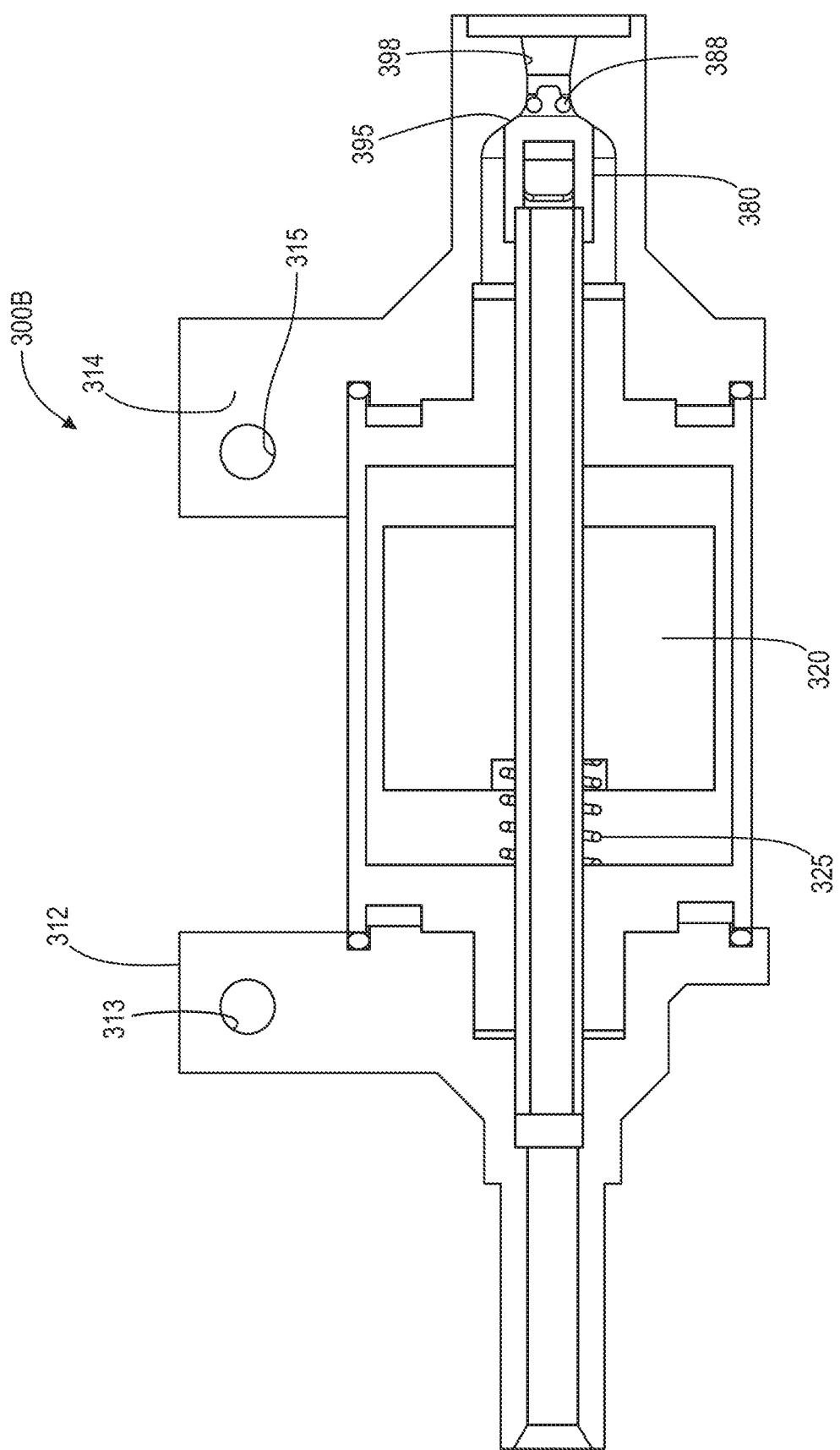
FIG. 12 is a cross-sectional view of the valve of FIG. 9 in a closed position or closed configuration.
Figure 13:
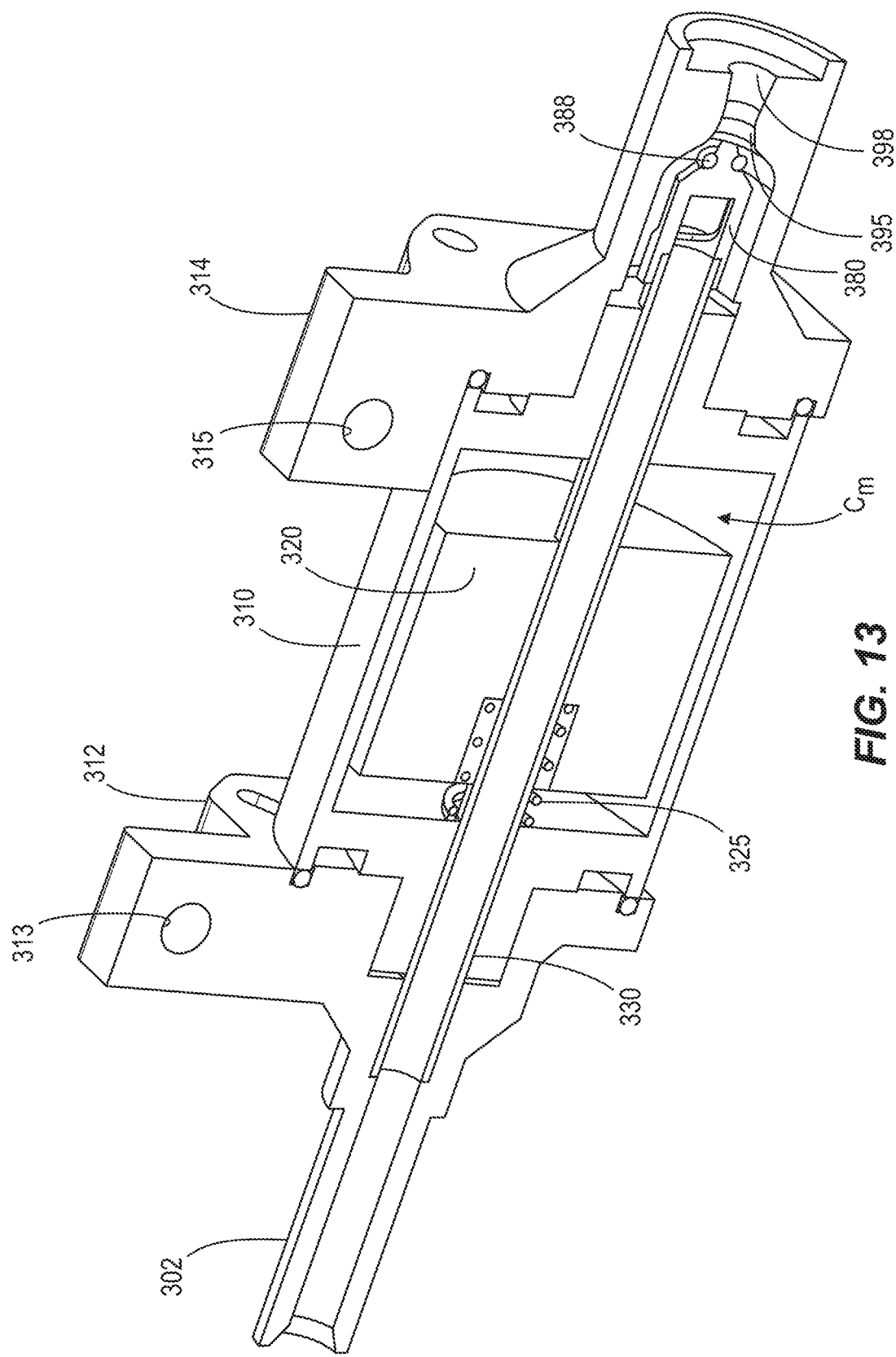
FIG. 13 is a perspective sectional view of the valve of FIG. 9.

The valve 300 optionally includes an inlet 302 in fluid communication with a fluid source as described above. Referring to FIG. 11, the inlet 302 is optionally in fluid communication with a first end of a conduit 330 (e.g., tube) which optionally extends at least partially through a valve body 310. The valve body 310 is optionally mounted to supports 312, 314. The supports 312, 314 optionally include mounting holes 313, 315, respectively for attaching the valve to a support surface (e.g., to the housing 110). The conduit 330 optionally extends through a magnet chamber Cm. A second end of the conduit 330 is optionally in fluid communication with an outlet chamber Cs. A stopper 380 is optionally mounted to the second end of the conduit 330. In a closed configuration of the valve 300, the stopper 380 optionally prevents fluid flow from exiting the outlet chamber Cs via an outlet opening 398. In some embodiments, the stopper 380 includes a seal 388 which may be supported on a tip 386 of the stopper. In some embodiments, in the closed configuration the stopper 380 presses the seal 388 against a surface 395 (e.g., annular surface) of the stopper chamber Cs such that fluid is substantially or completely prevented from passing from the stopper chamber Cs through the outlet opening 398. One example of a closed position or closed configuration of the valve 300 is shown in FIG. 12. In some embodiments, in the open configuration the seal 388 is displaced from the surface 395, permitting fluid to flow to the outlet opening 398. One example of an open position or open configuration of the valve 300 is shown in FIG. 11.

In some embodiments, the valve 300 comprises an actuator (e.g., voice coil actuator, electrically-operated actuator, etc.) for changing an operating state of (e.g., opening and closing) the valve 300. In some embodiments, the valve 300 includes an actuator that comprises and/or includes common features or functionality with Model No. DDLM-038-051-01 available from Moticont in Van Nuys, Calif. In some embodiments, the actuator (e.g., voice coil actuator) is capable of cycling (e.g., between positions or configurations of a magnet and/or of the valve 300) in a frequency range of over 30 hertz (e.g., over 40 hertz, between 30 and 50 hertz, between 40 and 50 hertz).

Referring to FIG. 11, a magnet 320 is optionally mounted to the conduit 330 and disposed inside magnet chamber Cm. The magnet 320 is optionally movable between first and second positions (e.g., in order to reconfigure the valve 300 from the closed configuration to the open configuration). In some embodiments, the magnet 320 is displaced between the first and second positions by selectively alternately imposing a current through one of two electrical coils 322a, 322b. It should be appreciated that in the illustrated embodiment, axial displacement (e.g., from left to right as viewed in FIG. 11) of magnet 320 axially displaces both conduit 330 and/or stopper 380. A spring 325 (e.g., compression spring, etc.) is optionally disposed to bias the magnet 320 into its first position in which the valve 300 is optionally in its closed configuration.

Figure 14:
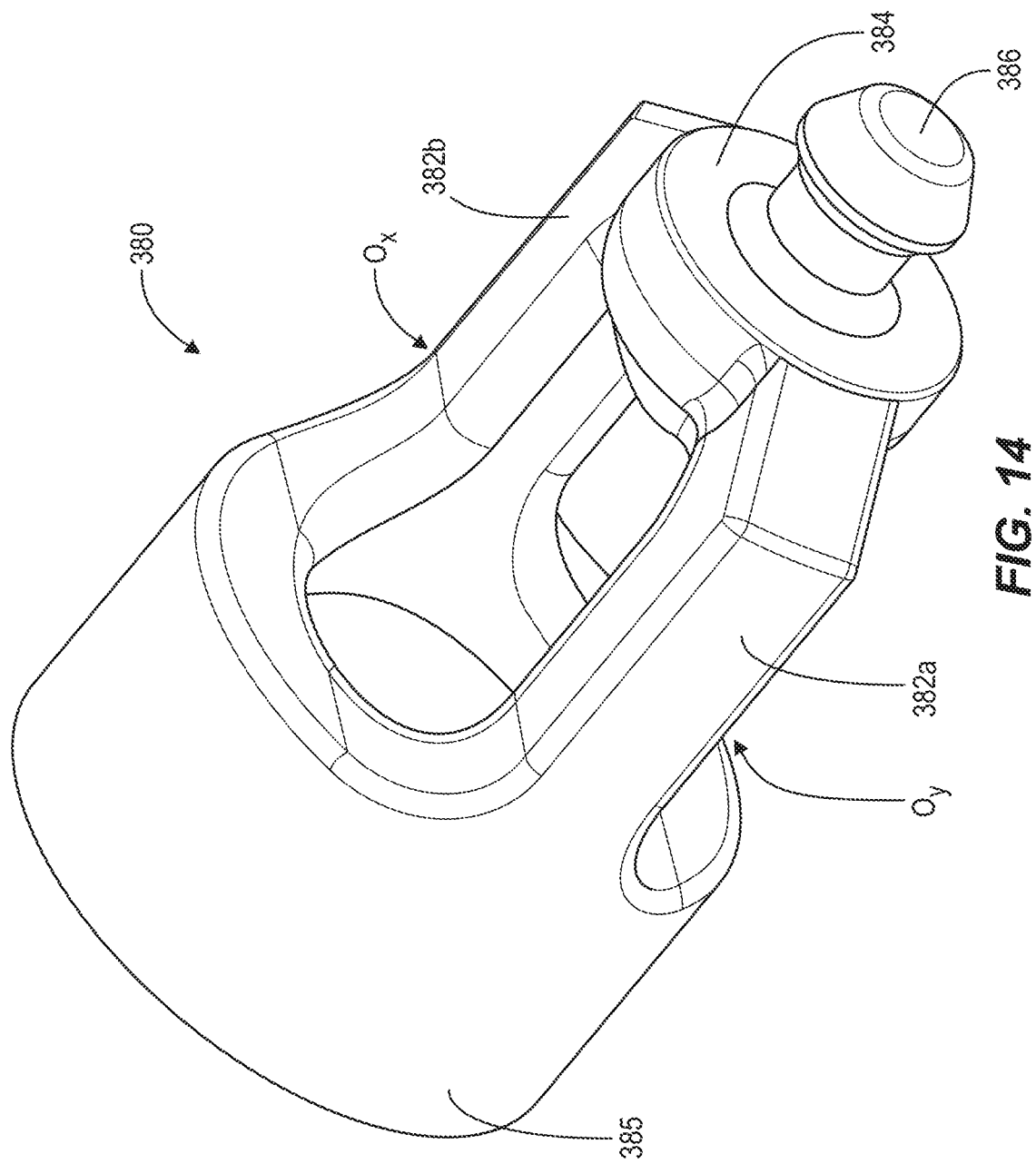
FIG. 14 is a perspective view of an embodiment of a valve stopper.

Referring to FIG. 14, one exemplary embodiment of the stopper 380 is shown in more detail. The stopper 380 optionally includes a mounting ring 385 which is optionally coupled to the conduit 330. The stopper 380 optionally includes a seal holder 384 having a tip 386 thereon for securing the seal 388 (e.g., o-ring) in place. One or more support arms (e.g., support arms 382a, 382b) are optionally coupled to both seal holder 384 and mounting ring 385. One or more openings (e.g., openings Ox and Oy) permit fluid to flow through the stopper (e.g., from the conduit 330).

In one exemplary description of operation of the valve 300, fluid initially flows through inlet 302 into the first end of conduit 330, generally along the direction F (see FIG. 11). Fluid then flows out of the second end of conduit 330. Fluid then flows out of the openings Ox, Oy in the stopper 380. In the closed configuration, fluid pressure optionally accumulates in the stopper chamber Cs and optionally tends to bias the seal 388 against the surface 395. A command signal (e.g., electrical current) is optionally used to displace magnet 320 into its second position such that the valve 300 reconfigures into its open configuration. In the open configuration, fluid flows from the stopper chamber Cs around seal 388 and out of the outlet opening 398.

Figure 16:
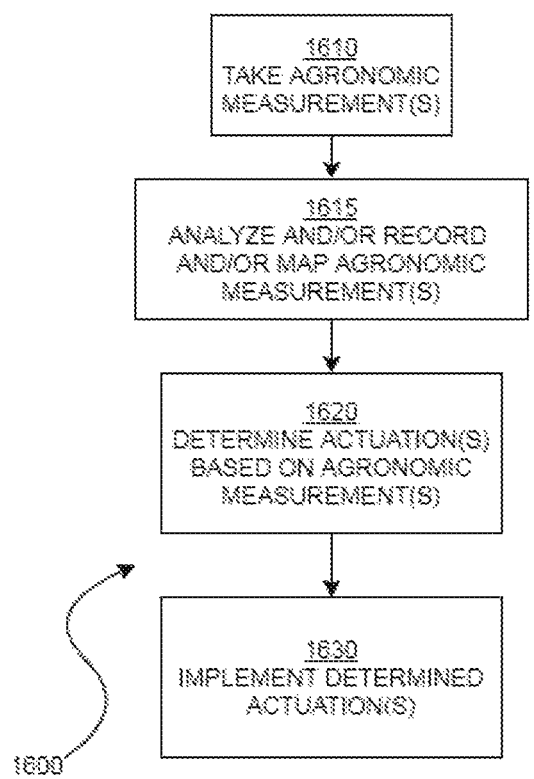
FIG. 16 schematically illustrates an example of a method for agronomic measurement and/or actuation.

Referring to FIG. 16, an embodiment of a method 1600 for monitoring agronomic measurements and/or controlling or actuating components of an implement (e.g., planter row unit) is illustrated. The method 1600 may be implemented using the system 500, the system 1700 described below (or other system embodiments) and optionally one or more additional actuators and an associated controller or controllers. At step 1610, the system optionally takes one or more agronomic measurements in or adjacent to the seed furrow (e.g., measures residue presence or amount such as by using a camera, reflectivity sensor, optical sensor or other sensor; detects soil temperature; measures soil moisture; detects seed presence such as by using a camera, reflectivity sensor, optical sensor or other sensor; measures soil color; detects organic matter; detects seed color; detects seed orientation; etc.). At step 1620, the system optionally analyzes, records, and/or creates a geo-referenced map of the agronomic measurement or measurements made at step 1610. At step 1630, the system optionally determines one or more actuations (e.g., appropriate actuation, desired actuation, recommended actuation, etc.) based at least in part on the one or more agronomic measurements made at step 1610. For example, the system may carry out one or more of the following actuations: controlling one or more liquid application valves (e.g., for application of any one or more of the following or a mixture thereof: water, fertilizer, biological, insecticide, fungicide, etc.) such as closing, opening or modifying an application rate of the one or more valves or modifying a product mixture to be applied by the valves; retracting, extending, or modifying a setting (e.g., downpressure, position, angle, aggressiveness, etc.) of a row cleaner, closing wheel, row unit downforce cylinder, or other actuator; controlling a seed metering criteria (e.g., modifying a seeding rate, seed type, etc.).

In various embodiments of the method 1600, the system performs one or more of the following actions: detects an amount of residue and adjusts a row cleaner setting (e.g., downpressure, position, angle, aggressiveness, etc.) based on the amount of residue; detects an amount of residue and adjusts a liquid application valve setting based on the amount of residue; detects a soil moisture and adjusts a liquid application valve setting based on the soil moisture level; detects one or more seeds and adjusts a liquid application valve setting based on the seed position or spacing; detects a soil color and adjusts a liquid application valve setting based on the soil color; detects an organic matter level and adjusts a liquid application valve setting based on the organic matter level; detects a seed color and adjusts a liquid application valve setting (e.g., by identifying based on the seed color that a seed is a refuge seed and applying a different liquid prescription, such as a rate or mixture, to the refuge seed than to a non-refuge seed); detects a seed orientation (e.g., aligned with the trench or normal to the trench, etc.) and adjusts a liquid application valve setting. It should be appreciated that in various embodiments, any measurement disclosed herein may be used to adjust any criterion or setting described herein based on the measurement or information derived from the measurement.

Figure 17:
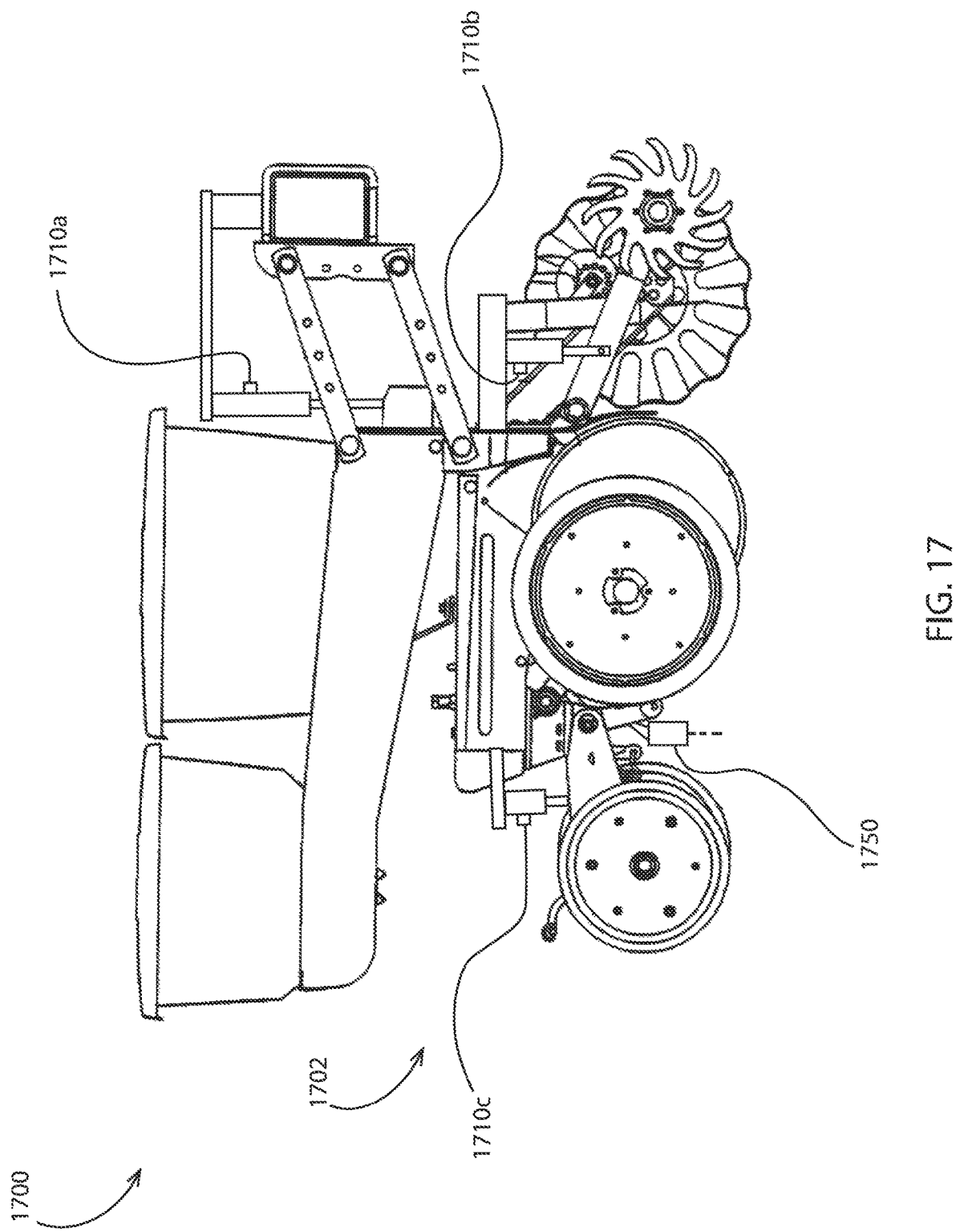
FIG. 17 schematically illustrates part of an example of a control and monitoring system on an example of a row unit.
Figure 18:
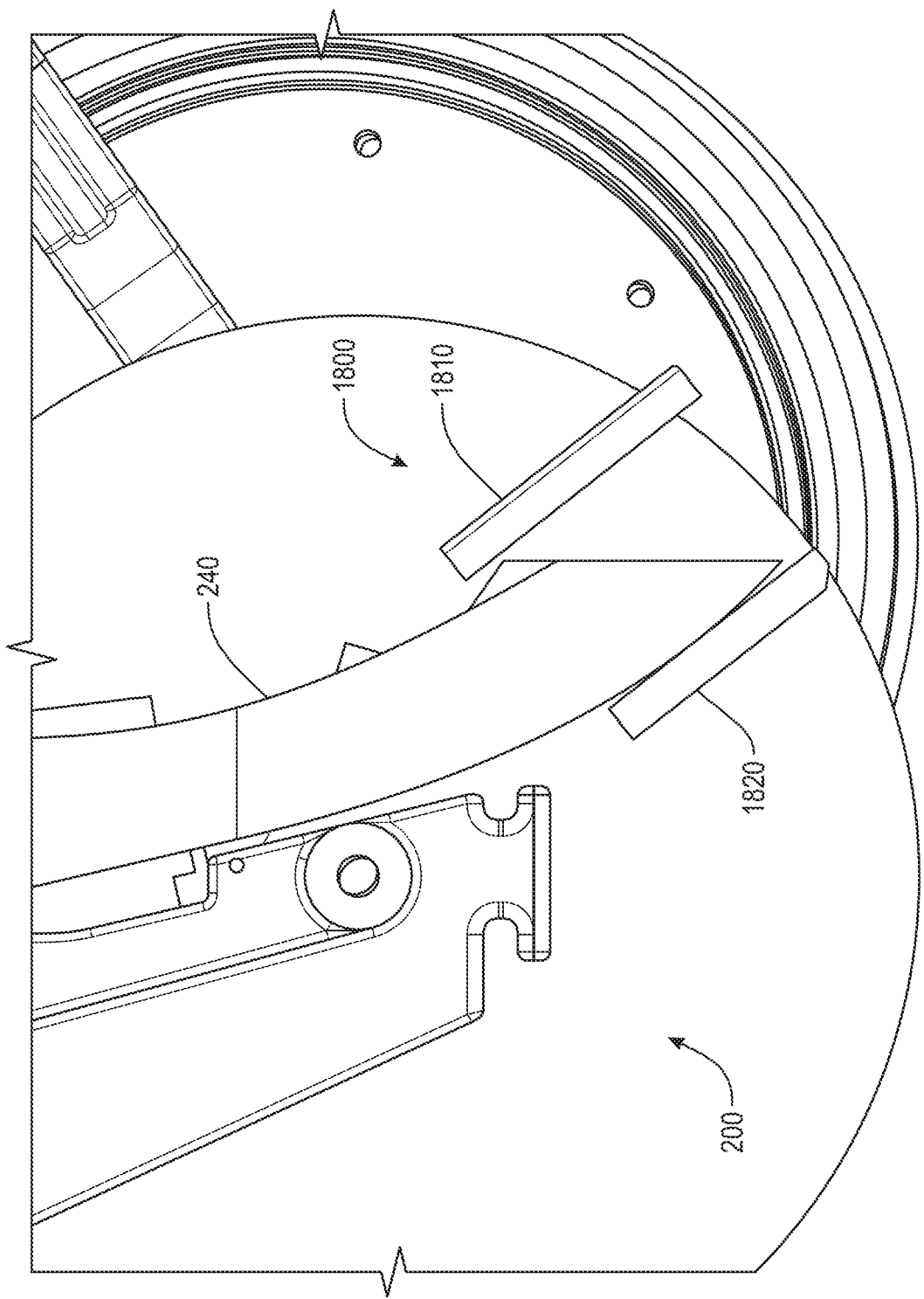
FIG. 18 is a side elevation view of an example of a seed sensor assembly.
Figure 20:
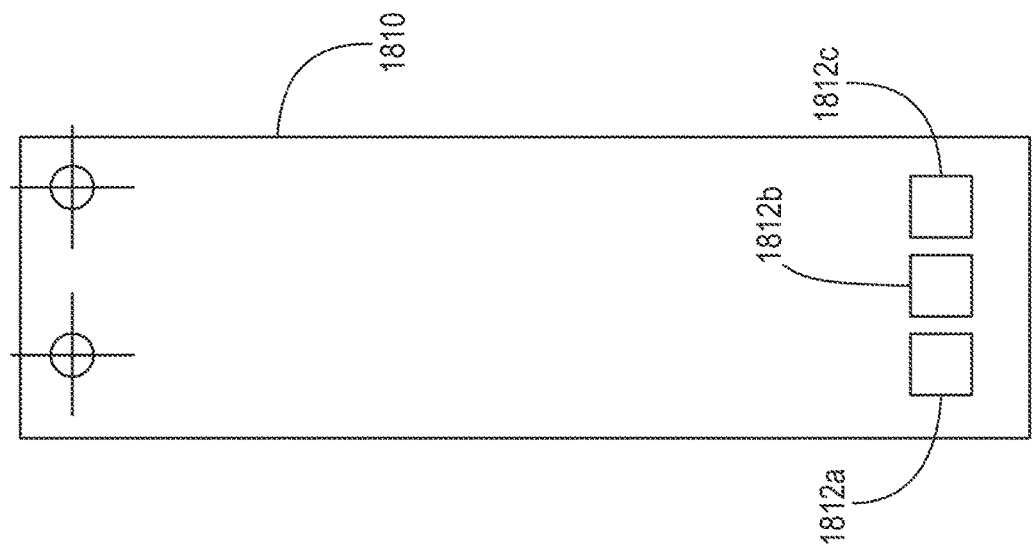
FIG. 20 is a plan view of an example of a receiver.
Figure 19:
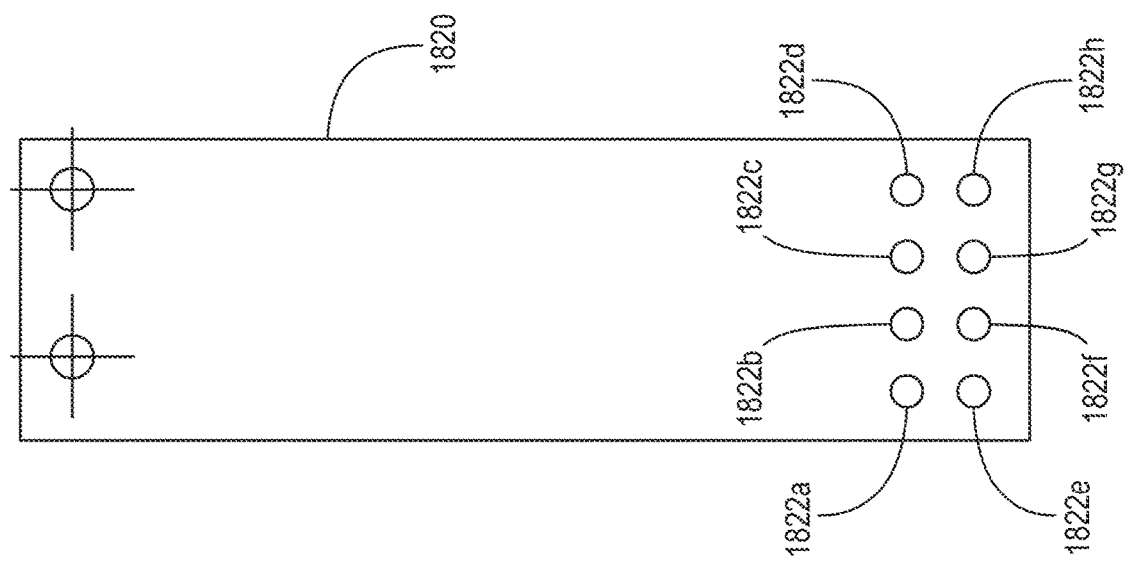
FIG. 19 is a plan view of an example of an emitter.
Figure 22:
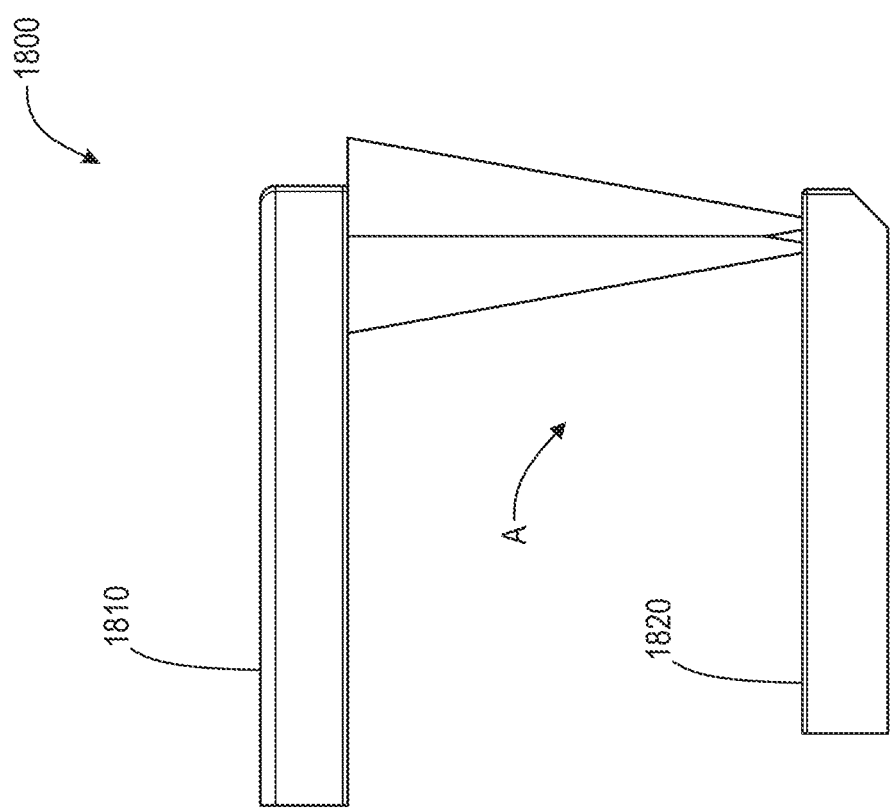
FIG. 22 is a side elevation view of the seed sensor assembly of FIG. 18 illustrating one example of a light transmission pattern.
Figure 21:
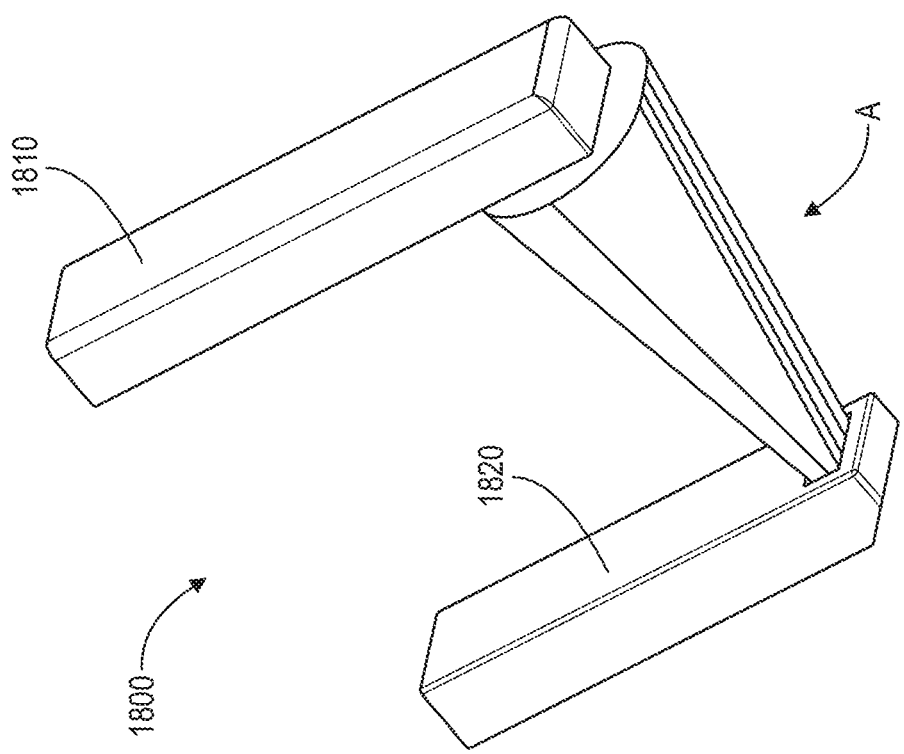
FIG. 21 is a perspective view of the seed sensor assembly of FIG. 18 illustrating one example of a light transmission pattern.

Referring to FIG. 17, an embodiment of a system 1700 is schematically illustrated which may be used to implement the method 1600. The system 1700 is shown operably supported on a row unit 1702. The system 1700 optionally comprises the system 1500 and optionally comprises one or more actuators in addition to the valve 300. For example, one or more position control actuators or downforce control valves 1710a, 1710b, 1710c may be included for controlling a setting (e.g., downpressure, position, angle, aggressiveness, etc.) of the row unit, row cleaners and closing wheels, respectively. The valves 1710 are optionally in data communication with the monitor 1512 and/or the controller 1514. The system 1700 optionally comprises one or more sensors 1750 (e.g., optical sensor, reflectivity sensor, camera, electromagnetic sensor, etc.). The one or more sensors 1750 is optionally in data communication with the monitor 1512 and/or the controller 1514. The one or more sensors 1750 is optionally disposed to measure a criterion associated with the seed furrow or an area adjacent to the seed furrow (for example, the one or more sensors 1750 is optionally disposed above the seed furrow and is optionally directly or indirectly supported on either a shank or a seed tube of the row unit).

In some embodiments, one or more liquid control valves (e.g., similar to or the same as valve 30) may be used to carry out a process of varying crop input applications (e.g., rate, mixture, spray pattern, product type, etc.) during a post-planting input application (e.g., sprayer application, side-dress application, etc.) based on the output of one or more sensors (e.g., crop spacing sensors, crop spacing consistency sensors, contact sensors, greenness index sensor, organic matter sensors, soil color sensors, etc.). One or more such sensors may be disposed on (e.g., at a lower end of) a sprayer drop assembly (e.g., disposed between rows of standing crop) such as one or more embodiments described in U.S. Pat. No. 9,167,745, incorporated herein by reference. In some embodiments, the one or more valves 300 may be removed from the planter and used in the post-planting application.

Turning to FIGS. 18-22, an embodiment of a seed sensor assembly 1800 is illustrated. The assembly 1800 optionally comprises an optical sensor but may comprise an acoustic, magnetic or other sensor in some embodiments. The assembly 1800 may be used in place of or in addition to the seed sensors described herein with respect to various system embodiments. The seed sensor assembly 1800 is optionally supported past the terminal end of a seed tube 240 by a bracket (not shown) or adjacent structure. The assembly 1800 optionally includes an emitter 1820 (e.g., comprising a circuit board) and a receiver 1810 (e.g., comprising a circuit board). The emitter 1820 optionally includes a plurality of emitter elements 1822 (e.g., optical emitters such as light-emitting diodes, etc.) which may be arranged in a grid arrangement (e.g., a 2 by 4 grid arrangement as illustrated or other arrangement). The receiver 1810 optionally includes a plurality of receiver elements 1812 (e.g., photodiodes, phototransistors, etc.) which are optionally generally aligned with the arrangement of emitter elements as illustrated. The receiver 1810 is optionally in data communication with a monitor or controller of any of the system embodiments described herein for communicating seed presence information. Seeds passing through an area A between the receiver elements and emitter elements optionally interrupt light transmission between the emitter and receiver. In embodiments in which the receiver elements produce a signal (e.g., current) that is proportional to light obstruction (e.g., received light intensity), the monitor optionally determines whether a seed has passed the assembly 1800 based in part on whether one or more receiver element signals has crossed a signal threshold (e.g., minimum current, maximum current, etc.) associated with the passage of a seed (e.g., if the signal changes but does not cross the signal threshold, the signal change may be ignored or otherwise not counted as a seed). In embodiments including a plurality of receiver elements, the monitor optionally determines whether a seed has passed the assembly 1800 based at least in part on the change in receiver element signals from the plurality of receiver elements (e.g., an obstruction affecting only one receiver element signal may be ignored and/or not counted as a seed, etc.).

Figure 23:
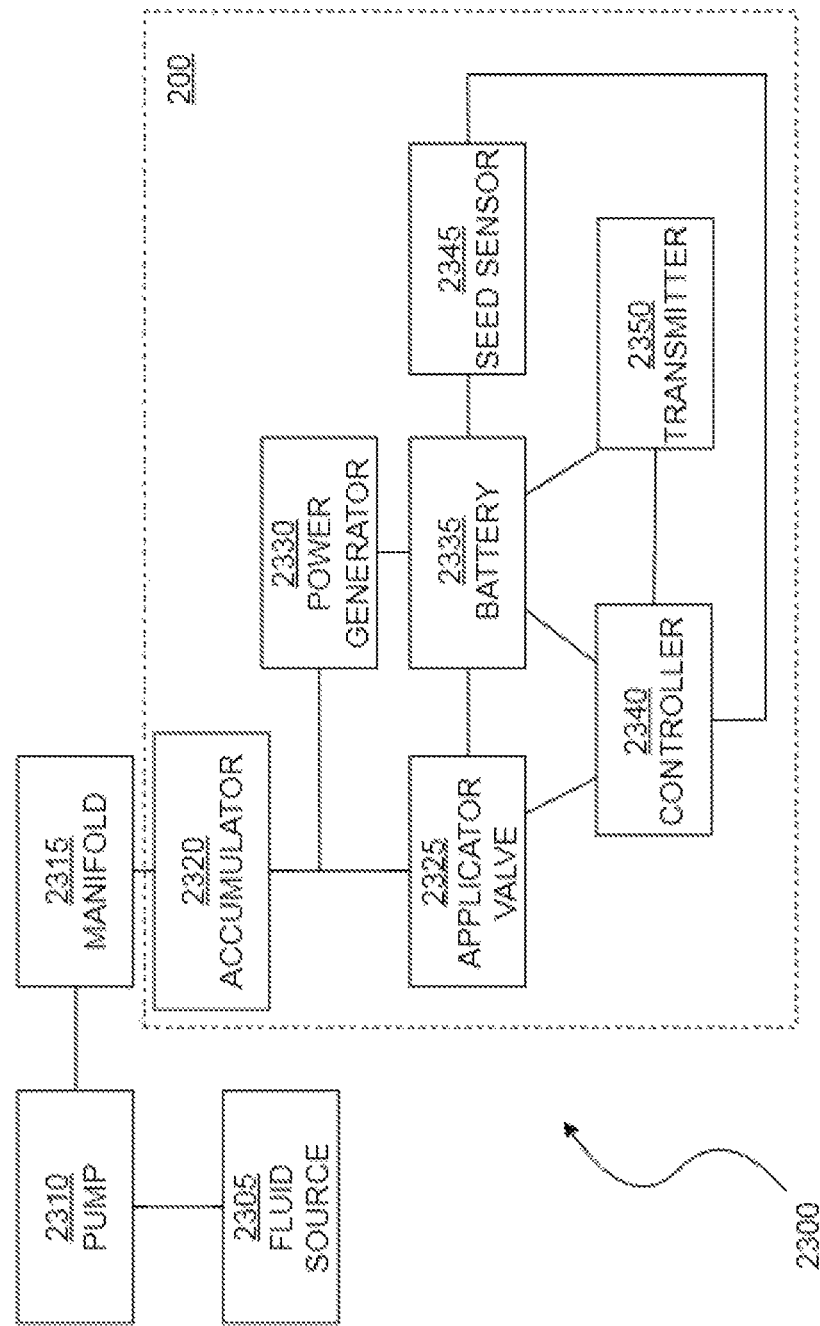
FIG. 23 schematically illustrates an example of a liquid control system.

Turning to FIG. 23, a control system 2300 is illustrated optionally having a power generator 2330 in fluid communication with a fluid source 2305 (e.g., a container containing a one or more crop inputs such as fertilizer, water, insecticide, herbicide, biological, etc.). The power generator 2330 is optionally powered by movement of fluid from the fluid source 2305. The power generator 2330 optionally charges a battery 2335 or other power source for powering various functions of an implement such as a planter row unit or monitoring and a control system therefor as described below.

Continuing to refer to FIG. 23, the control system 2300 optionally includes a pump 2310 in fluid communication with the fluid source 2305. The pump 2310 is optionally in fluid communication with and optionally pumps fluid to a manifold 2315. The manifold 2315 optionally distributes fluid to a plurality of row units 200 (or sections or groups or row units in some embodiments). The manifold 2315 is optionally in fluid communication with one or more applicator valves 2325 (e.g., one at each row unit or one for each group or section of row units) which may be similar to the valve 300 or other applicator valve embodiments described herein. The manifold is optionally in fluid communication with one or more of the valves 2325 via an accumulator 2320. The manifold 2315 is optionally in fluid communication with one or more power generators 2330 (e.g., a paddlewheel, turbine, or other element which is driven for rotation or other movement by flow or pressure fluid, e.g., of the fluid transmitted from the fluid source 2305). The power generator 2330 optionally charges (e.g., may be in electrical communication with) a battery 2335 or other power storage device. The battery 2335 optionally is in electrical communication with and optionally powers one or more of a controller 2340 (e.g., for controlling a state of the applicator valve 2325), a seed sensor 2345 (e.g., in data communication with the controller 2340), and a transmitter 2350 (e.g., a wireless transmitter for transmitting data from the seed sensor and/or controller to a central monitor and/or controller on the planter or in a tractor cab). In various embodiments, the power generator may be upstream of the accumulator and/or in series or in parallel with the accumulator.

Figure 24:
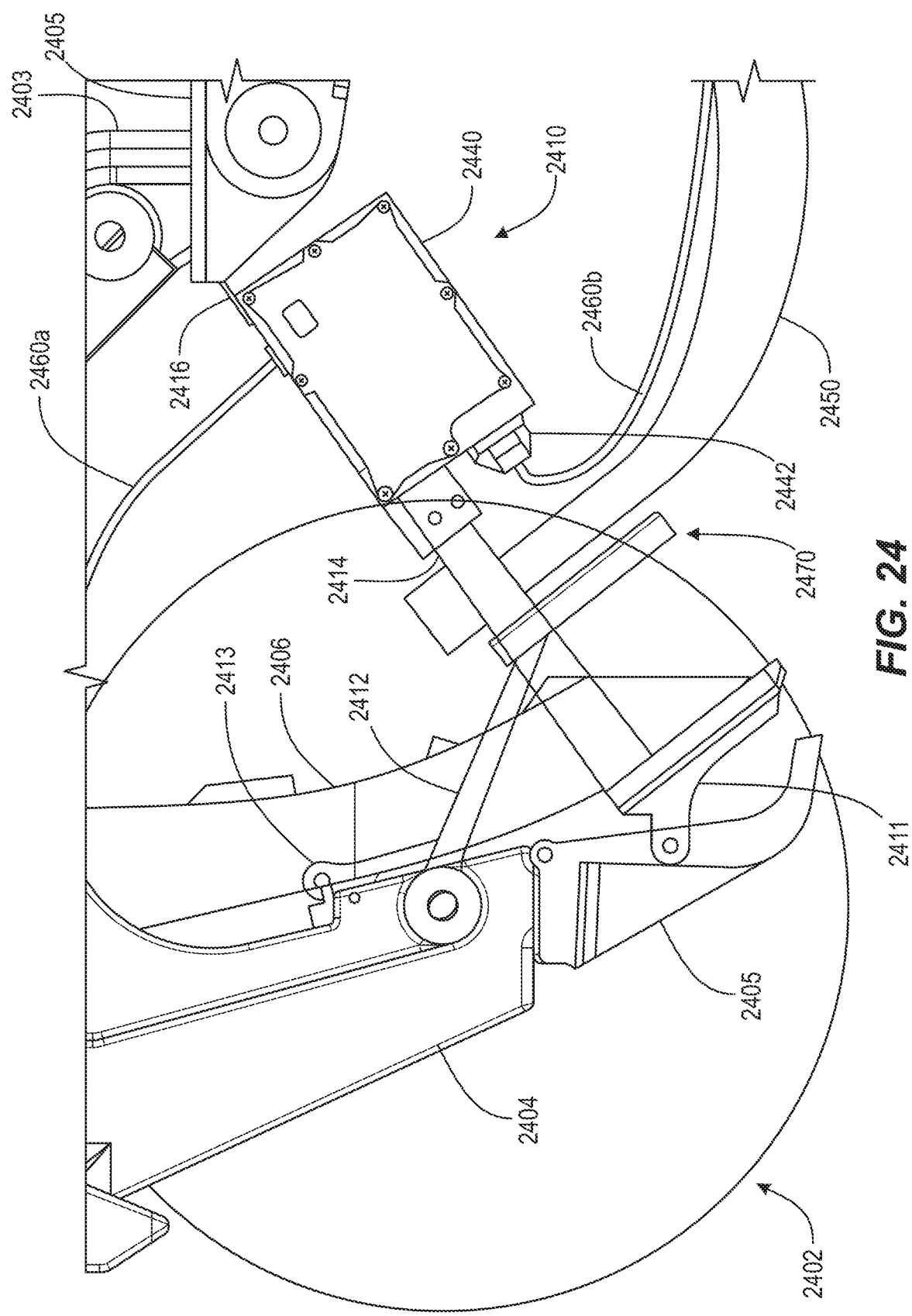
FIG. 24 is a side elevation view of an example of a mounting assembly.

Referring to FIG. 24, a mounting assembly 2410 is shown supported on a row unit 2402. The mounting assembly 2410 is optionally includes one or more brackets 2412 extending to the side of a seed tube 2406 and mounted to a shank 2404 of the row unit. The brackets 2412 are optionally bolted to the sides of the shank and/or engaged to the shank by one or more hooks 2413. In some embodiments the brackets 2412 may be omitted. The mounting assembly 2410 optionally includes one or more brackets 2411 mounted to the bayonet 2405 of the row unit. The mounting assembly 2410 optionally includes a medial portion 2414 which optionally supports a seed firmer 2450 or other planter attachment. The mounting assembly 2410 optionally includes a rear bracket 2416 mounted to a row unit subframe 2403 and/or a closing wheel support 2405 of the row unit. The mounting assembly 2410 optionally supports a seed sensor assembly 2470. The seed sensor assembly 2470 may comprise or have common features and/or functionality with one of the seed sensor assemblies described herein. The seed sensor assembly 2470 is optionally supported below and/or past a terminal end of the seed tube 2406. The seed sensor assembly 2470 is optionally supported separately from the seed tube 2406. The mounting assembly 2410 optionally supports a liquid control system 2440 optionally including a control valve 2442. The control system 2440 may comprise or have common features and/or functionality with one of the control system assemblies described herein. Fluid is optionally supplied to the valve 2442 via a conduit 2460a. The valve 2442 is optionally in fluid communication with a conduit 2460b. The conduit 2460b is optionally supported on the seed firmer 2450 (or other attachment). An outlet of conduit 2460b is optionally positioned behind or adjacent to the seed firmer 2450 and is optionally aligned with the seed furrow opened by the row unit 2402.

Figure 25:
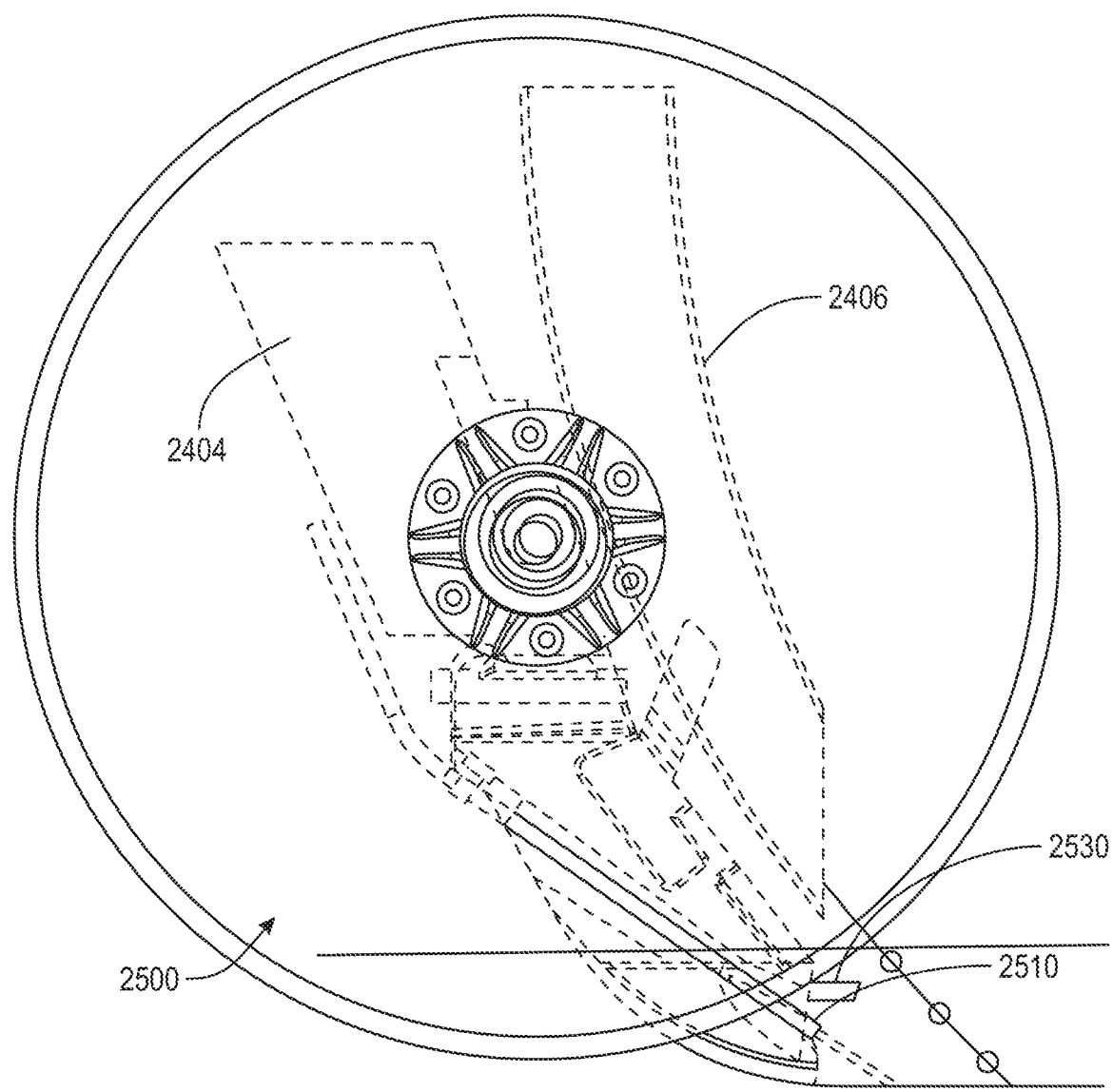
FIG. 25 is a side elevation view of a seed tube guard sensor and application assembly.
Figure 26:
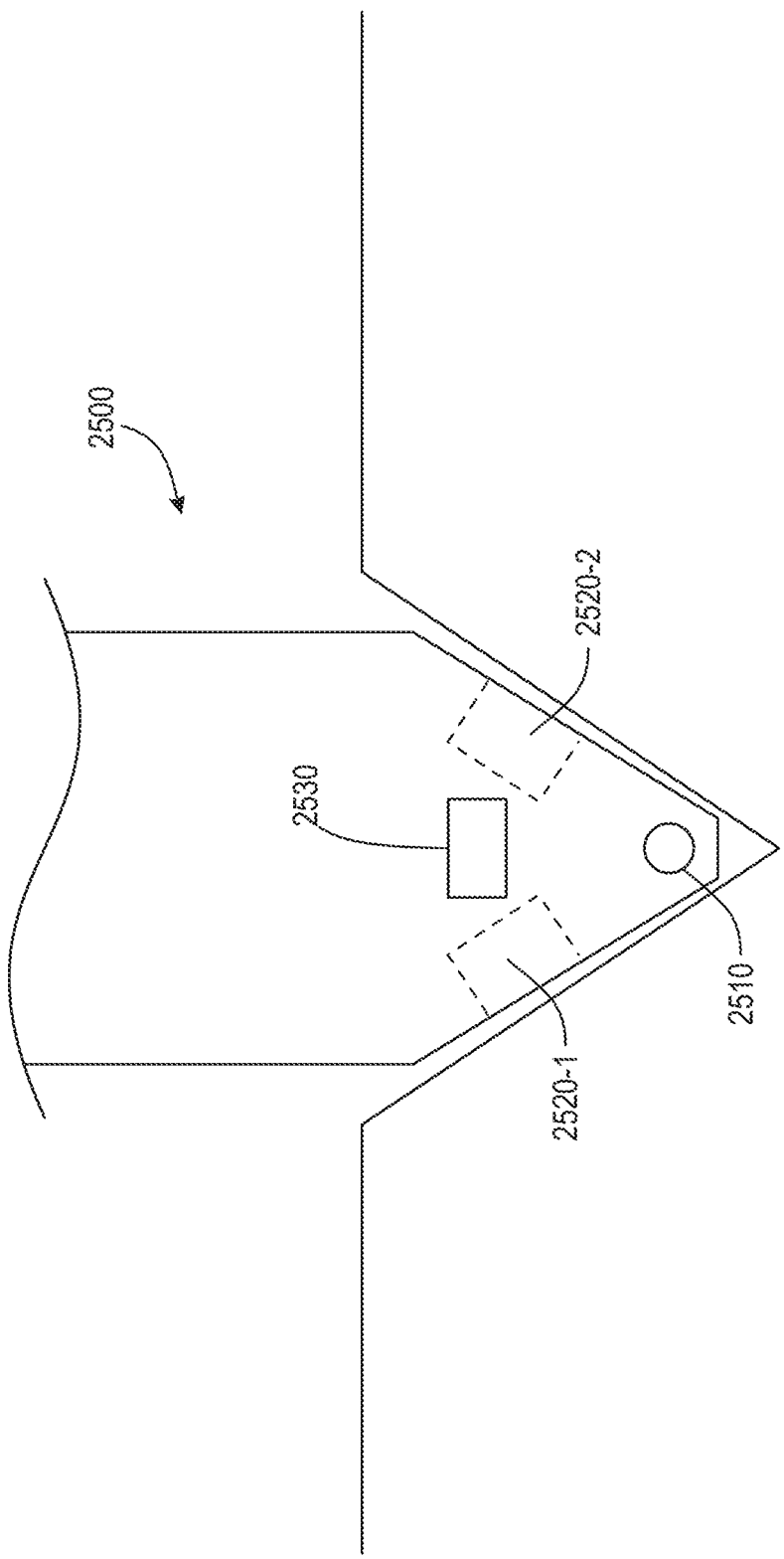
FIG. 26 is a rear view of the assembly of FIG. 25.

Referring to FIGS. 25 and 26, a seed tube guard 2500 is illustrated having one or more features for applying crop input and/or sensing soil or seed characteristics. An applicator conduit 2510 optionally mounted to the seed tube guard 2500 is optionally used to apply crop input near the seed tube guard 2500 and/or forward of the seed deposition location. In various embodiments, the applicator conduit 2510 may be mounted to an external surface of the seed tube guard 2500 and/or extend at least partially through an opening in the seed tube guard 2500. One or more sensors 2520 (optionally disposed at least partially inside the seed tube guard) may be disposed and configured to measure one or more soil characteristics (e.g., of the soil forming the sidewalls of the trench). A wear element (e.g., tungsten carbide) is optionally disposed on a side of the seed tube guard 2500 forward of and/or adjacent to the sensor 2520. A sensor 2530 is optionally disposed on a surface (e.g., rearward, lower, forward, etc.) of the seed tube guard 2500. The sensor 2530 is optionally configured to measure one or more soil and/or crop input characteristics. In some embodiments, one or more sensors may be incorporated in the seed tube guard 2500, but the crop input device (e.g., conduit) may be omitted or located elsewhere on the row unit.

One or more of the sensors 2520, 2530 optionally comprise optical sensors, reflectivity sensors, cameras, electromagnetic sensors, etc. The sensors optionally measure one or more of reflectivity, soil temperature, soil moisture, soil color, organic matter, etc.

The control systems described herein may perform one or more control actions based on measurements made by one or more sensors 2520, 2530. For example, the system may carry out one or more of the following actuations: controlling one or more liquid application valves (e.g., for application of any one or more of the following or a mixture thereof: water, fertilizer, biological, insecticide, fungicide, etc.) such as closing, opening or modifying an application rate of the one or more valves or modifying a product mixture to be applied by the valves; retracting, extending, or modifying a setting (e.g., downpressure, position, angle, aggressiveness, etc.) of a row cleaner, closing wheel, row unit downforce cylinder, or other actuator; controlling a seed metering criteria (e.g., modifying a seeding rate, seed type, etc.).

Figure 27:
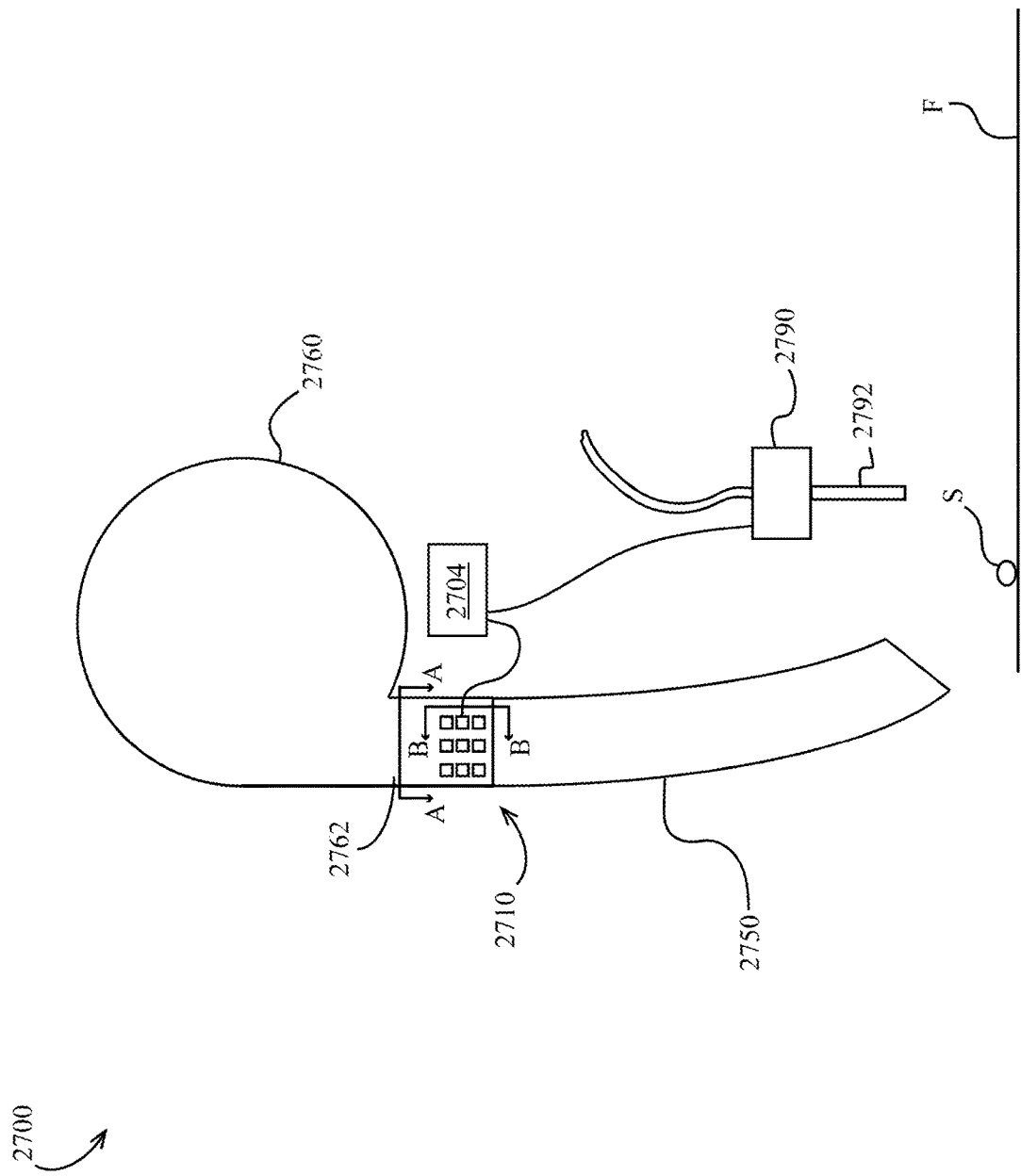
FIG. 27 is a partial side elevation view of an embodiment of a planter row unit.
Figures 28, 29:
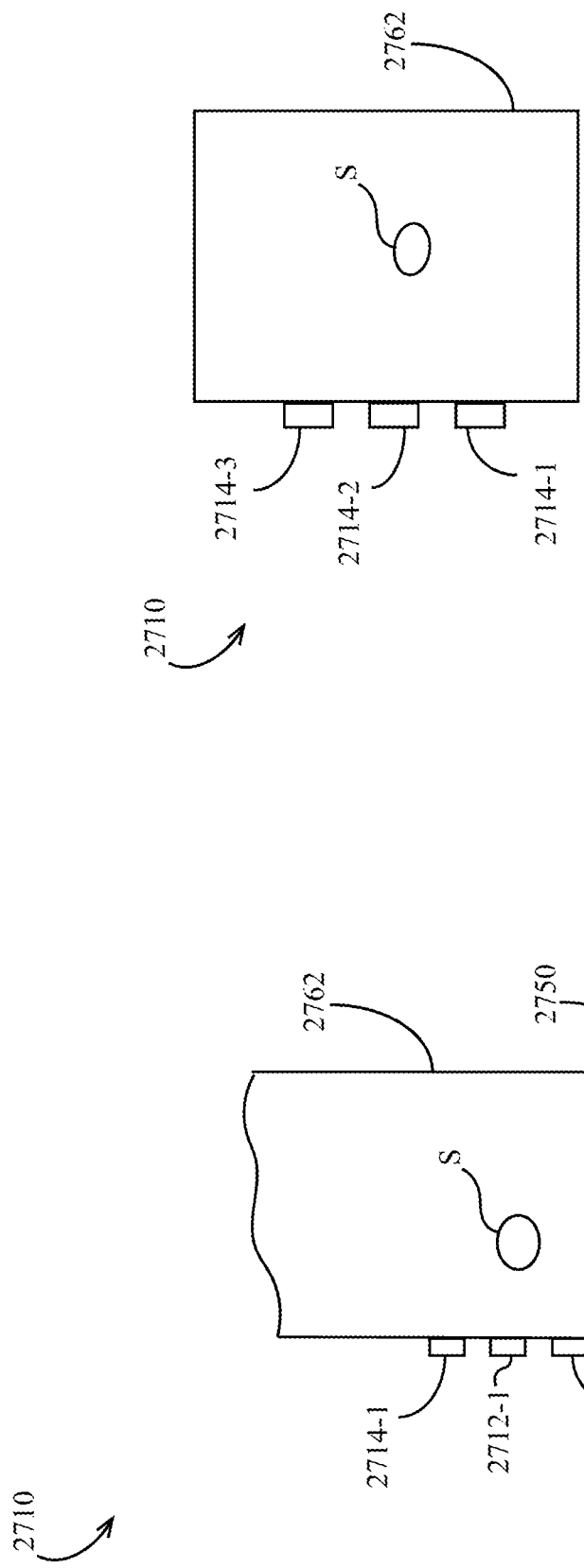
FIG. 28 is a view along section A-A of FIG. 27.
FIG. 29 is a view along section B-B of FIG. 27.

Referring to FIGS. 27-29, a crop input monitoring system 2700 is illustrated incorporated in a planter row unit 2702 which may have common features and/or functionality with a row unit embodiment disclosed in U.S. Pat. No. 6,776,108 incorporated by reference herein. The system 2700 optionally comprises a seed sensor 2710 which is optionally provided on (e.g., mounted to, supported on, mounted in) an outlet 2762 of a seed meter 2760. The seed sensor 2710 is optionally disposed above a seed tube 2750 (or other seed delivery mechanism) optionally disposed to receive seeds S from the meter outlet 2762 and deliver seeds to a furrow F. A crop input outlet 2792 is optionally disposed to selectively deposit crop input (e.g., any one or more of the following or a mixture thereof: water, fertilizer, biological, insecticide, fungicide, etc.) in or near the furrow F; the crop input is optionally selectively applied (e.g., turned on or off, applied at varying rates, applied in varying patterns, etc.) by operation of a valve 2790. In some embodiments, the seed sensor 2710 is in data communication with a controller 2704 for transmission of seed signals to the controller; the controller optionally uses the seed signals to determine a control signal to send to the valve 2790 (e.g., to control the position of crop input relative to the seed S in the furrow such as by applying crop input on a seed S or adjacent to a seed S).

The seed sensor 2710 may be of any type (e.g., optical, electromagnetic, etc.) and configuration. In some embodiments, the sensor 2710 comprises one or more transmitters 2712 associated with one or more first receivers 2714 and/or second receivers 2716. The transmitters and receivers are disposed on the same side of the meter outlet in some embodiments such that the receivers 2714, 2716 detect reflectance of light or other waves transmitted by transmitter 2712 from a seed S in the meter outlet. In other embodiments, the transmitters and receivers are disposed on opposing sides of the meter outlet.

In some embodiments, a plurality of associated transmitter-receiver groups are disposed along a length and/or width of the meter outlet; in some such embodiments, the controller 2704 is configured to modify an estimated seed position (and/or a seed travel time between the seed sensor 2710 and the furrow F) based on the longitudinal and/or transverse position of the seed sensor relative to one or more sidewalls of the meter outlet. For example, the controller 2704 may determine a longer seed travel time (and thus a longitudinally forward seed position in the furrow F) for a seed S disposed significantly closer to one of a pair of opposing sidewall of the seed meter outlet than for a seed disposed approximately equidistant from each the opposing sidewalls.

Figure 30:
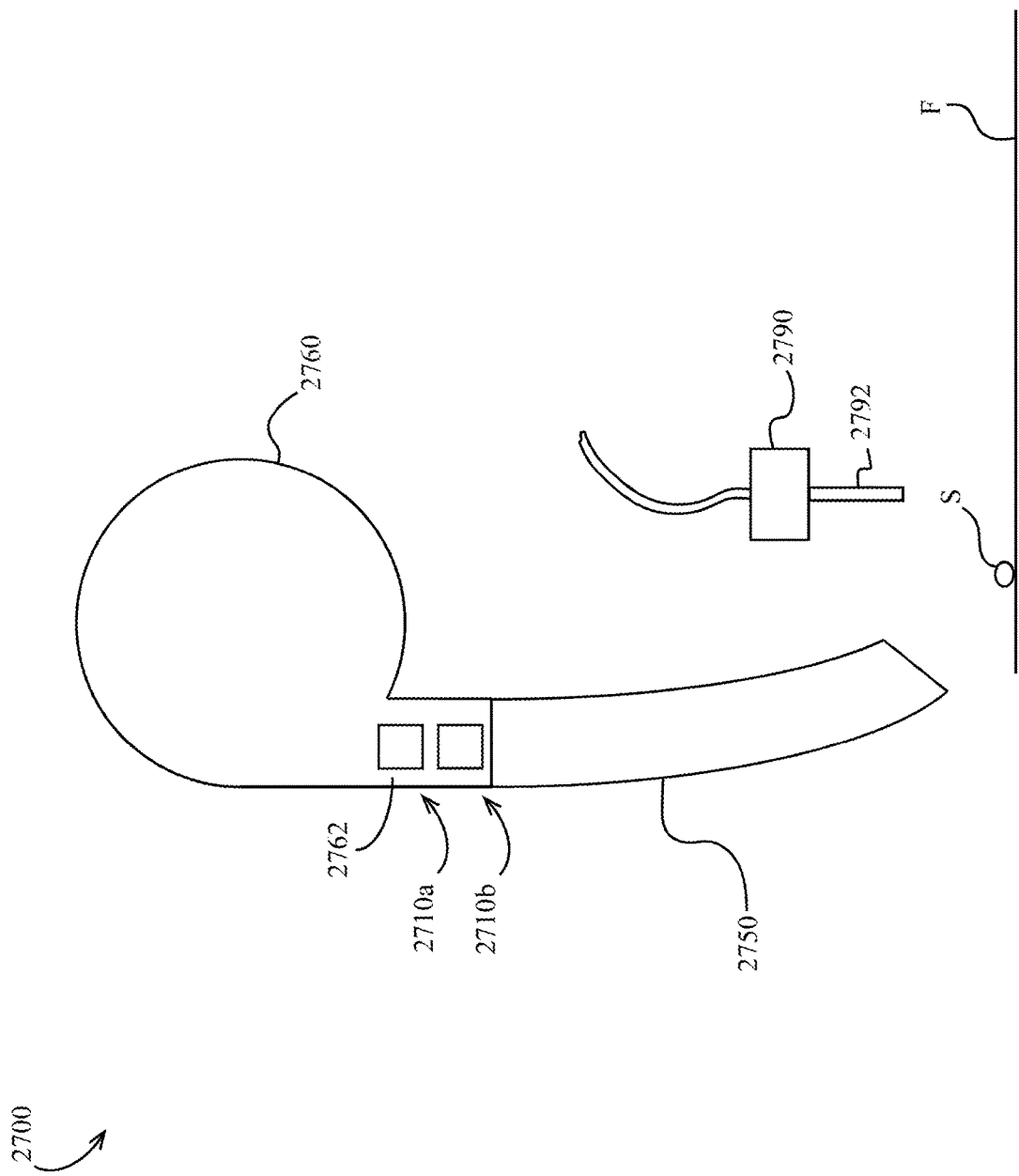
FIG. 30 is a partial side elevation view of another embodiment of a planter row unit.

Referring to FIG. 30, another embodiment of a system 2700' is illustrated in which a plurality (e.g., two) seed sensors 2710 are provided in vertically spaced apart relation for detecting seeds S deposited by meter 2760. The signal provided by both sensors is optionally used (e.g., by controller 2704) to determine seed velocity and/or speed. For example, a distance between the seed positions upon being detected by the first and second sensors may be divided by the time between seed signals to determine the seed velocity and/or speed. This velocity and/or speed is optionally used to calculate a seed position in furrow F and/or a seed travel time between the seed sensor 2710b and the furrow F). In various embodiments, a first seed sensor 2710a is disposed on the meter outlet 2762 and the second seed sensor 2710b is disposed below the first seed sensor 2710b in various embodiments (1) on the seed meter outlet 2762, (2) on the seed tube 2750, or (3) at or below an egress end of the seed tube.

In various implementations of the system 2700', the seed velocity and/or speed may be used to estimate a location of the seed at a given time. For example, the seed velocity and/or speed may be used to estimate the time at which a seed reaches a crop input application location (e.g., a location at which crop input is to be applied, such as by one of the valve embodiments described herein). In some implementations, a nominal time Tn required for the seed to reach the crop input application location (or another location in other embodiments) at one or more measured seed speeds and/or velocities is determined empirically. The nominal time Tn may then be adjusted (e.g., using a multiplier or calibration table) to an estimated time Te based on the measured seed speed and/or velocity during planting operations. The estimated time Te can then be used to time the application of a crop input, e.g., to apply a crop input at a time Te after a seed sensor signal such that crop input is applied on or adjacent to a seed (e.g., in the seed furrow).

Figure 31:
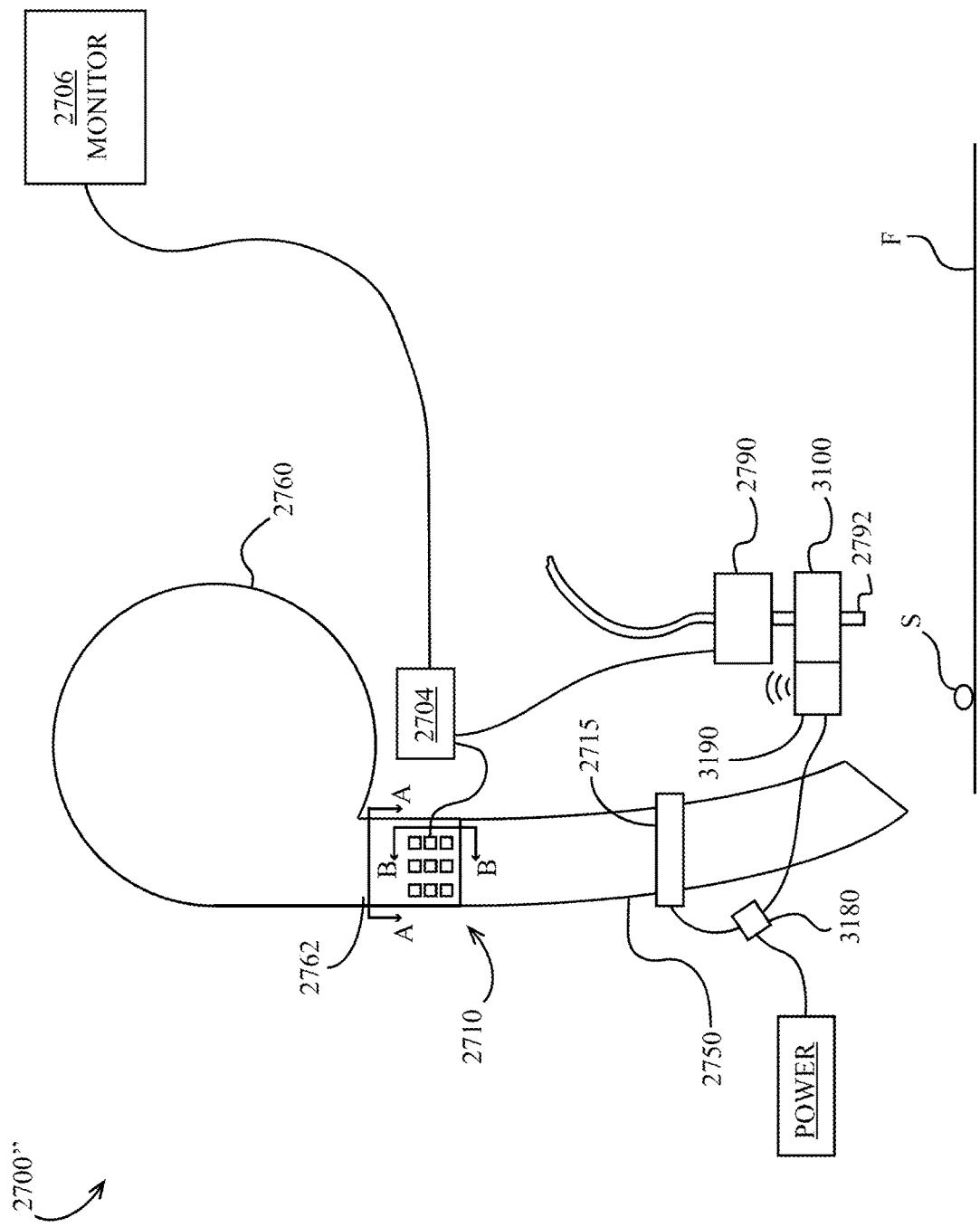
FIG. 31 schematically illustrates another embodiment of a crop input monitoring system.

Referring to FIG. 31, another embodiment of a system 2700" is illustrated comprising a flow sensor 3100 configured to monitor the flow of crop input applied to the furrow F. In some embodiments, the flow sensor 3100 monitors flow of crop input without the use of mechanically moving parts such as turbines or paddles. In some embodiments, the flow sensor 3100 comprises an ultrasonic sensor. In some embodiments, the flow sensor 3100 comprises another sensor such as a Coriolis flow meter or magnetic flow meter.

In some embodiments, the valve 2790 of system 2700' is one of the valve embodiments disclosed herein, e.g., an embodiment of valve 300.

In some embodiments, the valve 2790 is in data communication with a monitor 2706 for displaying crop input application information (e.g., application rate, application type, application location, etc.) to a user. The monitor 2706 is optionally located in the cab of an implement such as a tractor. The monitor 2706 optionally comprises a multipurpose consumer tablet computing device, or other computing device. The monitor 2706 is optionally also in data communication with a seed sensor 2710 and/or a conventional seed sensor 2715 for receiving and displaying seeding information (e.g., spacing, population, etc.) to the user. The monitor 2706 optionally displays both seeding and crop input application information (e.g., on the same user interface screen).

In some embodiments, the sensor 3100 is used without a valve 2790; e.g., a sensor such as an ultrasonic sensor may be used to monitor the application of crop input with or without controlling the application at the row unit.

In some embodiments, the valve 2790 is in data communication with the monitor 2706 and/or controller 2704 via a wireless transmitter 3190. The transmitter 3190 is optionally supported on or adjacent to the thing valve 2790 and is optionally supported on the row unit.

In some embodiments, a power line used to supply power to seed sensor 2710 and/or to a conventional seed sensor 2715 is optionally split (e.g., using a splitter 3180) in order to supply power to the valve 2790 and/or the transmitter 3190.

Figure 32:
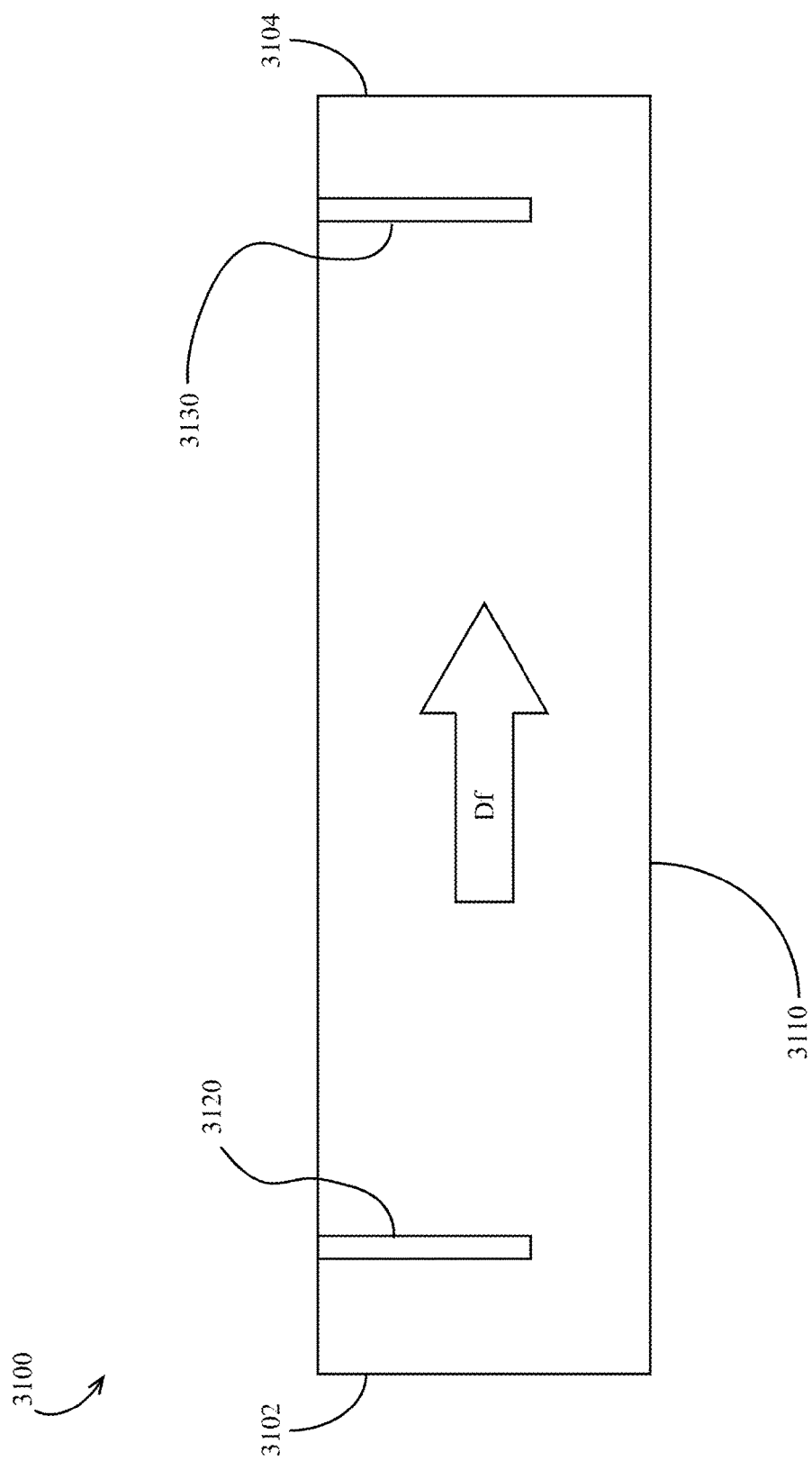
FIG. 32 schematically illustrates an embodiment of an ultrasonic flow sensor.

Referring to FIG. 32, an exemplary embodiment of a sensor 3100 comprising an ultrasonic sensor is illustrated. The exemplary sensor 3100 optionally comprises a body 3110 through which fluid (e.g., liquid crop input) generally flows along direction Df. The exemplary sensor 3100 optionally comprises a first transmitter/receiver 3120 and a second transmitter/receiver 3130. The transmitter/receivers are optionally configured to generate and detect waves (e.g., ultrasonic waves) in the fluid flowing through body 3110. The sensor 3100 optionally includes processing circuitry (not shown) in data communication with the transmitter/receivers 3120, 3130. The sensor 3100 optionally determines a flow rate of fluid in the body 3110 based at least in part on a difference between a transmission time along the direction Df (e.g., from transmitter/receiver 3120 to transmitter 3130) and the transmission time opposite the direction Df (e.g., from transmitter/receiver 3130 to transmitter 3120). In some embodiments, the sensor 3100 may comprise an ultrasonic sensor such as Audiowell International Part No. US0002-000 and/or Steiner & Martins, Inc. Part No. SMFM21F1000SS.

In some embodiments, the monitor 2706 is configured to adjust the calculated flow rate based on the signal generated by sensor 3100 by applying an adjustment based at least in part on an operating criterion (e.g., frequency, pulse rate, application rate, etc.) of valve 2790.

In some embodiments, the monitor 2706 is configured to identify the presence of contaminant in the fluid (e.g., crop input) in body 3110 based on the signal generated by sensor 3100.

In some embodiments, the monitor 2706 is configured to identify an unmixed state of in the fluid (e.g., crop input comprising multiple chemicals or other components) in body 3110 based on the signal generated by sensor 3100.

In some embodiments, the monitor 2706 is configured to perform a calibration to determine a relation between signal generated by sensor 3100 and a flow rate measurement and/or to select one of a plurality of calibrations (e.g., calibration constants, calibration curves) for a new fluid (e.g., new crop input) in body 3110 based on the signal generated by sensor 3100.

In some embodiments, the monitor 2706 is configured to estimate the temperature of the fluid (e.g., crop input) in body 3110 based on the signal generated by sensor 3100.

Figure 33:
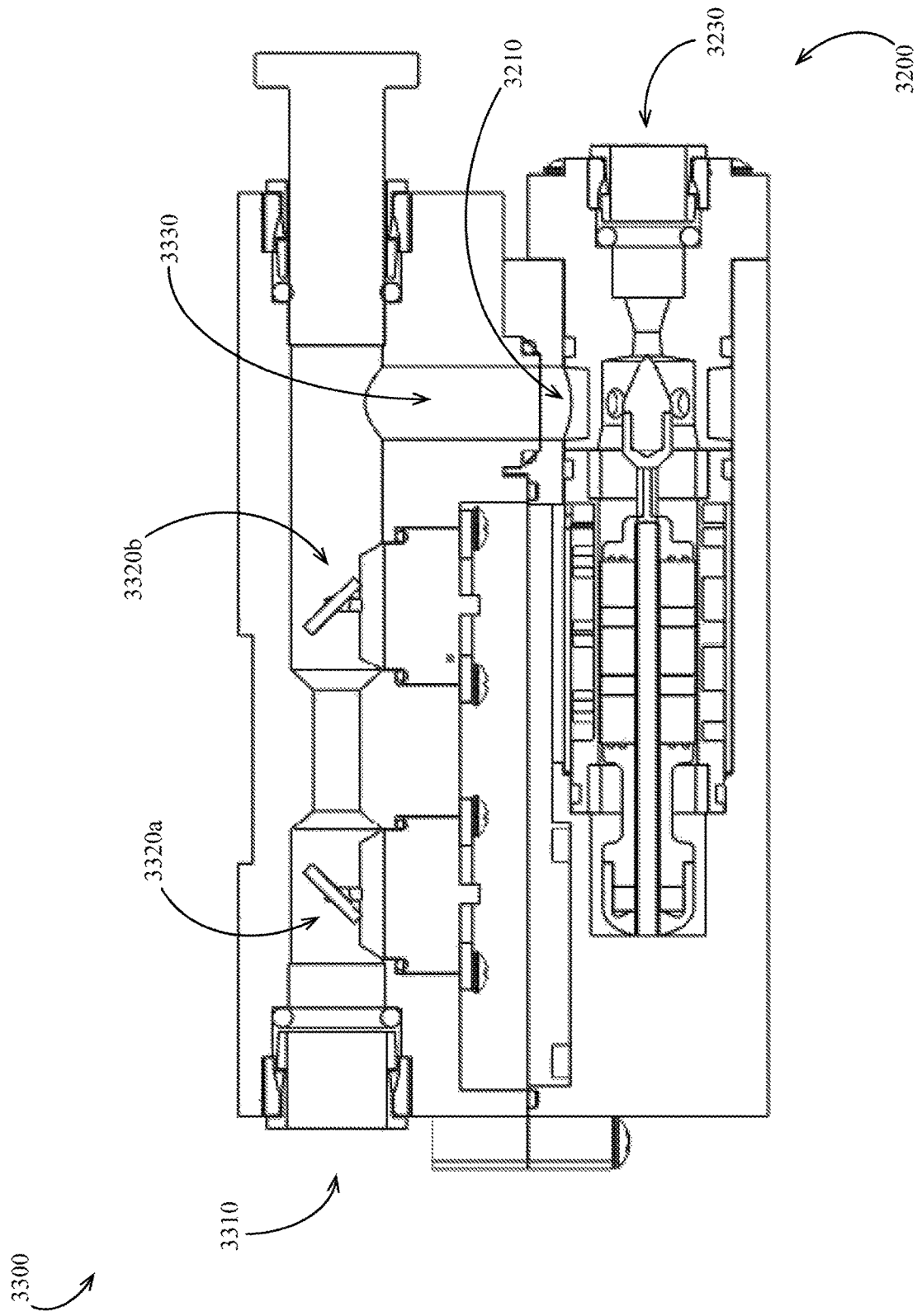
FIG. 33 is a cross-sectional view of another embodiment of an ultrasonic flow sensor in combination with an embodiment of a flow control valve.

Referring to FIG. 33, another embodiment of an ultrasonic sensor 3300 is illustrated in combination with an embodiment of a flow control valve 3200 which may be similar to other valve embodiments disclosed herein. The sensor 3300 is optionally mounted to the valve 3200 but may be disposed separately from the valve in other embodiments. In operation, fluid flows into an inlet 3310 of the sensor 3300, past ultrasonic transducers 3320a, 3320b (e.g., transmitter-receivers) and out of an outlet 3330 of the sensor. The fluid then optionally flows into an inlet 3210 of the valve 3200 and is selectively released from the valves 3200 via an outlet 3230.

In some embodiments, a viscometer may be used in combination with an ultrasonic sensor in order to calibrate the signal generated by the ultrasonic flow meter. For example, a multiplier or offset may be determined based on the viscosity of a liquid and then applied to the signal generated by the ultrasonic flow meter.

Figure 34:
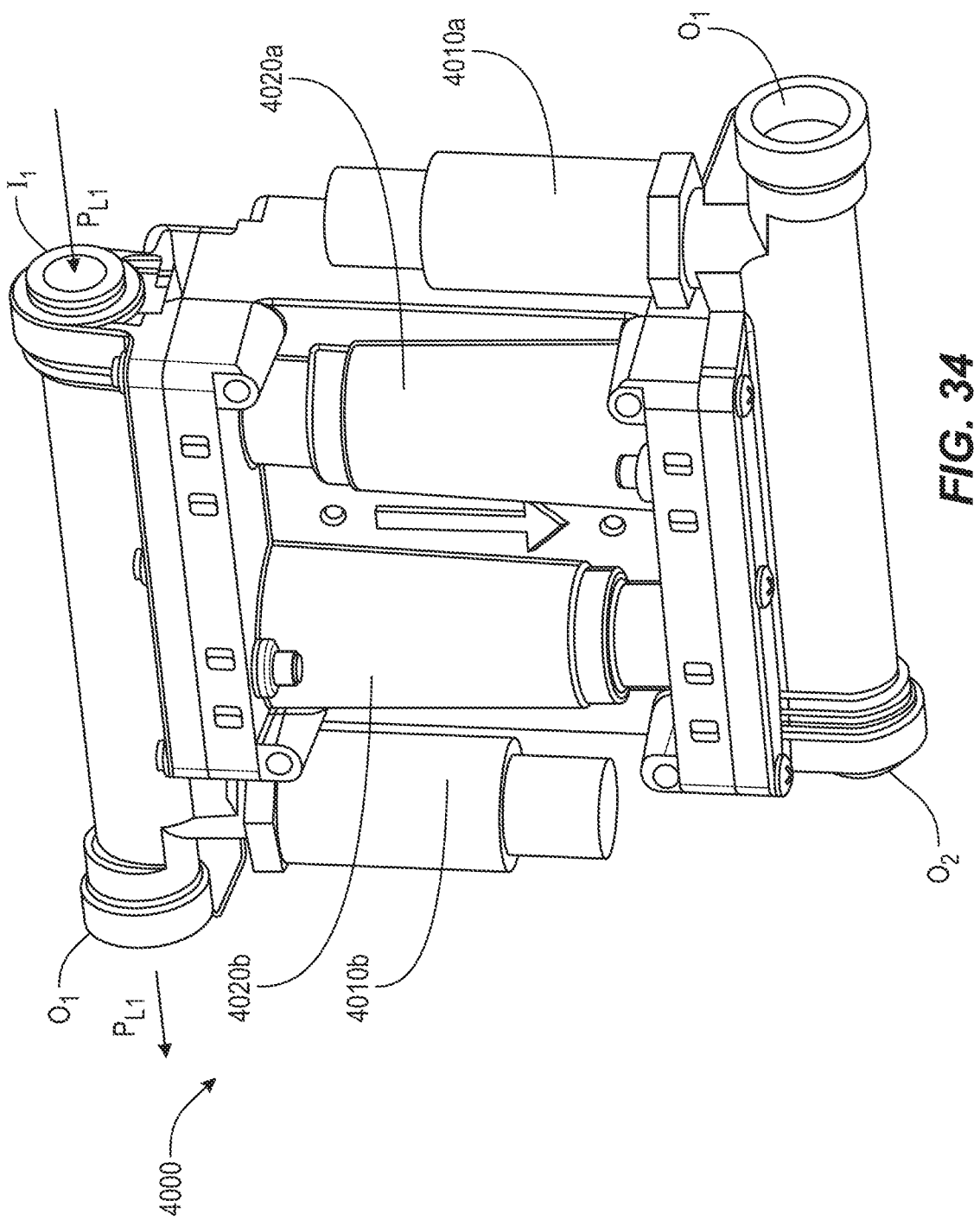
FIG. 34 is a perspective view of an embodiment of a viscometer.

Although any suitable viscometer may be used for the purpose described herein, an embodiment of a viscometer 4000 is illustrated in FIGS. 34, 35A and 35B which may be used to measure the viscosity of fluid in one or more fluid lines in fluid communication with the ultrasonic sensor embodiments described herein. As seen in FIG. 34, in some embodiments the viscometer measures the viscosity in flow path $P_{L1}$ and optionally in a second flow path (not shown); the following description relates to the measurement of a single flow path $P_L$.

The viscometer 4000 optionally includes a pressure sensor 4010 and a liquid sensor body 4020. Referring to FIG. 35A, the viscometer 4000 optionally includes a plunger 4030 which is movable between a first plunger stop 4040 and a second plunger stop 4042. The viscometer optionally includes a position sensing magnet 4050 supported on the plunger 4030. A hall effect sensor 4062 is optionally disposed to measure a position of the magnet 4050. The hall effect sensor 4062 is optionally in data communication with and/or supported on a printed circuit board 4060.

In other embodiments, the attenuation of the ultrasonic flow meter signal may be used to calibrate the ultrasonic flow meter signal in addition or alternatively to measuring viscosity directly. For example, a multiplier or offset may be determined based on the signal attenuation of the ultrasonic flow meter and then applied to the signal generated by the ultrasonic flow meter. It should be appreciated that the attenuation of the signal generated by the ultrasonic flow meter (i.e., the percentage reduction in signal amplitude between the transmitter and the receiver) may be related to the viscosity of the liquid.

Although various examples and embodiments have been described above, the details and features of the disclosed examples and embodiments are not intended to be limiting, as many variations and modifications will be readily apparent to those of skill in the art. Accordingly, the scope of the present disclosure is intended to be interpreted broadly and to include all variations and modifications within the scope and spirit of the appended claims and their equivalents. For example, any feature described for one example or embodiment may be used in any other example or embodiment.

The invention claimed is:

1. A crop input monitoring system comprising:
   a seed sensor configured to sense seeds, said seed sensor disposed outside of a seed tube;
   a crop input outlet for depositing crop input; and
   a valve connected to the crop input outlet, the valve configured to selectively control the crop input being deposited through the crop input outlet; and
   a controller, the controller in communication with the seed sensor and the valve, the controller programmed to use a seed signal from the seed sensor to determine a control signal to send to the valve to selectively control the crop input being deposited through the crop input outlet;
   wherein the controller is programmed to adjust a nominal time, determined empirically, for one or more of the seeds to reach an application location at one or more measured seed speeds and/or velocities to an estimated time for a subsequent single seed to reach the application location based on the speed and/or velocity of the single seed as measured by the seed sensor, and using the estimated time to time the application of the crop input.

2. The crop input monitoring system of claim 1 further comprising a seed delivery mechanism for delivering the seeds.

3. The crop input monitoring system of claim 2 wherein the seed delivery mechanism comprises the seed tube connected to an outlet of a seed meter.

4. The crop input monitoring system of claim 3 wherein the seed sensor is provided on the outlet of the seed meter.

5. The crop input monitoring system of claim 3 wherein the seed sensor is disposed above the seed tube.

6. The crop input monitoring system of claim 1 wherein the control signal is configured to control a position of the crop input relative to the single seed.

7. The crop input monitoring system of claim 1 wherein the seed sensor comprises one or more transmitters and one or more associated receivers.

8. The crop input monitoring system of claim 7 wherein the one or more transmitters and the one or more associated receivers are disposed on a same side of a seed delivery mechanism.

9. The crop input monitoring system of claim 7 wherein the one or more transmitters and the one or more associated receivers are disposed on different sides of a seed delivery mechanism.

10. The crop input monitoring system of claim 1 wherein the seed sensor comprises a plurality of associated transmitter-receiver groups disposed along a length or width of a seed meter outlet.

11. The crop input monitoring system of claim 1 wherein the seed sensor comprises a plurality of associated transmitter-receiver groups disposed along a length or width of a seed meter outlet, the controller programmed to modify an estimated seed position based on a longitudinal and/or transverse position of the seed sensor relative to one or more sidewalls of the seed meter outlet.

12. The crop input monitoring system of claim 1 comprising a plurality of seed sensors provided in vertically spaced apart relation for detecting the seeds, the controller programmed to use seed signals from the plurality of seed sensors to determine the speed and/or velocity of the single seed.

13. The crop input monitoring system of claim 12 wherein the controller is programmed to use the speed and/or velocity of the single seed to calculate a seed position and/or a seed travel time.

14. The crop input monitoring system of claim 13 wherein the controller is programmed to use the speed and/or velocity of the single seed to determine the estimated time at which the single seed reaches the application location.

15. The crop input monitoring system of claim 1 comprising a wireless transmitter, wherein the valve is in communication with the controller via the wireless transmitter.

16. A method of monitoring a crop input comprising:
sensing seeds at a location outside of a seed tube with a seed sensor;
depositing a crop input through a crop input outlet;
selectively controlling the depositing of the crop input using a valve;
communicating, with a controller, with the seed sensor and the valve, the controller using a seed signal from the seed sensor to determine a control signal to send to the valve to selectively control the depositing of the crop input through the crop input outlet; and
the controller adjusting a nominal time, determined empirically, for one or more of the seeds to reach an application location at one or more measured seed speeds and/or velocities to an estimated time for a subsequent single seed as measured by the seed sensor, and using the estimated time to time the application of the crop input.

17. The method of claim 16 further comprising using the control signal to control a position of the crop input relative to the single seed.

18. The method of claim 16 further comprising the controller modifying an estimated seed position based on a longitudinal and/or transverse position of the seed sensor relative to one or more sidewalls of a seed meter outlet.

19. The method of claim 16 further comprising the controller using seed signals from a plurality of seed sensors to determine the speed and/or velocity of the single seed.

20. The method of claim 19 further comprising the controller using the speed and/or velocity of the single seed to calculate a seed position and/or a seed travel time.

21. The method of claim 20 further comprising the controller using the speed and/or velocity of the single seed to determine the estimated time at which the single seed reaches the application location.

* * * * *